(12) United States Patent
Nappi

(10) Patent No.: US 8,010,451 B1
(45) Date of Patent: Aug. 30, 2011

(54) EFFECTING FINANCIAL TRANSACTIONS

(75) Inventor: Bruce Nappi, Weston, MA (US)

(73) Assignee: A3 Society LLC, Wilmington, DE (US)

( * ) Notice: Subject to any disclaimer, the term of this patent is extended or adjusted under 35 U.S.C. 154(b) by 0 days.

(21) Appl. No.: 12/730,008

(22) Filed: Mar. 23, 2010

Related U.S. Application Data

(63) Continuation of application No. 10/669,929, filed on Sep. 24, 2003, now Pat. No. 7,729,984.

(60) Provisional application No. 60/414,073, filed on Sep. 27, 2002.

(51) Int. Cl.
*G06Q 40/00* (2006.01)
(52) U.S. Cl. .......................................... 705/39; 705/35
(58) Field of Classification Search .................. 705/64, 705/65, 78
See application file for complete search history.

(56) References Cited

U.S. PATENT DOCUMENTS

| | | |
|---|---|---|
| 3,941,977 A | 3/1976 | Voss et al. |
| 3,956,615 A | 5/1976 | Anderson et al. |
| 4,025,760 A | 5/1977 | Trenkamp |
| 4,228,746 A | 10/1980 | Caton |
| 4,678,895 A | 7/1987 | Tateisi et al. |
| 4,755,940 A | 7/1988 | Brachtl et al. |
| 4,797,913 A | 1/1989 | Kaplan et al. |
| 4,822,984 A | 4/1989 | Remery et al. |
| 4,935,962 A | 6/1990 | Austin |
| 4,947,028 A | 8/1990 | Gorog |
| 4,947,163 A | 8/1990 | Henderson et al. |
| 4,948,174 A | 8/1990 | Thomson et al. |
| 4,974,878 A | 12/1990 | Josephson |
| 4,977,595 A | 12/1990 | Ohta et al. |
| 5,010,238 A | 4/1991 | Kadono et al. |
| 5,121,945 A | 6/1992 | Thomson et al. |
| 5,220,501 A | 6/1993 | Lawlor et al. |
| 5,224,162 A | 6/1993 | Okamoto et al. |
| 5,265,007 A | 11/1993 | Barnhard, Jr. et al. |

(Continued)

FOREIGN PATENT DOCUMENTS

CN 1285562 2/2001

(Continued)

OTHER PUBLICATIONS

Winig, Eric; Jul. 20, 2001; Washington Business Journal, vol. 20, Issue 11, p. 21.*

(Continued)

*Primary Examiner* — Samica L Norman
(74) *Attorney, Agent, or Firm* — Fish & Richardson P.C.

(57) ABSTRACT

A financial account that represents value is maintained on behalf of an account holder. The financial account has a plurality of account identifiers that enable a party that presents a debit account identifier to effect a debit transaction in the account, or a party that presents a general account identifier to effect both debit and credit transactions in the account. A third party is permitted to effect a credit transaction in the account by presenting a credit identifier, which is an identifier different from the debit or general account identifiers. The credit identifier is insufficient to enable a third party to effect a debit transaction in the account.

96 Claims, 8 Drawing Sheets

U.S. PATENT DOCUMENTS

| | | | |
|---|---|---|---|
| 5,267,149 A | 11/1993 | Anada et al. | |
| 5,280,518 A | 1/1994 | Danler et al. | |
| 5,283,829 A | 2/1994 | Anderson | |
| 5,294,782 A | 3/1994 | Kumar | |
| 5,301,247 A | 4/1994 | Rasmussen et al. | |
| 5,326,959 A | 7/1994 | Perazza | |
| 5,329,589 A | 7/1994 | Fraser et al. | |
| 5,336,870 A | 8/1994 | Hughes et al. | |
| 5,371,794 A | 12/1994 | Diffie et al. | |
| 5,371,797 A | 12/1994 | Bocinsky, Jr. | |
| 5,386,106 A | 1/1995 | Kumar | |
| 5,387,784 A | 2/1995 | Sarradin | |
| 5,412,193 A | 5/1995 | Swartz et al. | |
| 5,420,405 A | 5/1995 | Chasek | |
| 5,453,601 A | 9/1995 | Rosen | |
| 5,461,217 A | 10/1995 | Claus | |
| 5,465,206 A | 11/1995 | Hilt et al. | |
| 5,465,291 A | 11/1995 | Barrus et al. | |
| 5,475,585 A | 12/1995 | Bush | |
| 5,477,040 A | 12/1995 | Lalonde | |
| 5,478,993 A | 12/1995 | Derksen | |
| 5,479,510 A | 12/1995 | Olsen et al. | |
| 5,483,445 A | 1/1996 | Pickering | |
| 5,484,988 A | 1/1996 | Hills et al. | |
| 5,485,370 A | 1/1996 | Moss et al. | |
| 5,485,510 A | 1/1996 | Colbert | |
| 5,489,773 A | 2/1996 | Kumar | |
| 5,494,136 A | 2/1996 | Humble | |
| 5,511,121 A | 4/1996 | Yacobi | |
| 5,536,923 A | 7/1996 | Foglino | |
| 5,557,516 A | 9/1996 | Hogan | |
| 5,557,518 A | 9/1996 | Rosen | |
| 5,566,981 A | 10/1996 | Alcordo | |
| 5,572,572 A | 11/1996 | Kawan et al. | |
| 5,590,196 A | 12/1996 | Moreau | |
| 5,590,197 A * | 12/1996 | Chen et al. | 705/65 |
| 5,623,547 A | 4/1997 | Jones et al. | |
| 5,629,982 A | 5/1997 | Micali | |
| 5,637,846 A | 6/1997 | Boers et al. | |
| 5,654,696 A | 8/1997 | Barrett et al. | |
| 5,671,279 A | 9/1997 | Elgamal | |
| 5,671,280 A | 9/1997 | Rosen | |
| 5,677,955 A | 10/1997 | Doggett et al. | |
| 5,696,827 A | 12/1997 | Brands | |
| 5,704,046 A | 12/1997 | Hogan | |
| 5,712,913 A | 1/1998 | Chaum | |
| 5,715,314 A | 2/1998 | Payne et al. | |
| 5,717,868 A | 2/1998 | James | |
| 5,724,424 A | 3/1998 | Gifford | |
| 5,727,163 A | 3/1998 | Bezos | |
| 5,739,511 A | 4/1998 | Pedersen | |
| 5,745,886 A | 4/1998 | Rosen | |
| 5,748,740 A | 5/1998 | Curry et al. | |
| 5,752,582 A | 5/1998 | Hayward | |
| 5,778,067 A | 7/1998 | Jones et al. | |
| 5,781,631 A | 7/1998 | Chaum | |
| 5,794,218 A | 8/1998 | Jennings et al. | |
| 5,796,832 A | 8/1998 | Kawan | |
| 5,796,841 A | 8/1998 | Cordery et al. | |
| 5,799,087 A | 8/1998 | Rosen | |
| 5,812,670 A | 9/1998 | Micali | |
| 5,815,657 A | 9/1998 | Williams et al. | |
| 5,825,881 A | 10/1998 | Colvin, Sr. | |
| 5,832,089 A | 11/1998 | Kravitz et al. | |
| 5,839,119 A | 11/1998 | Krsul et al. | |
| 5,850,442 A | 12/1998 | Muftic | |
| 5,850,446 A | 12/1998 | Berger et al. | |
| 5,857,023 A * | 1/1999 | Demers et al. | 705/78 |
| 5,864,667 A | 1/1999 | Barkan | |
| 5,866,889 A | 2/1999 | Weiss et al. | |
| 5,869,826 A | 2/1999 | Eleftheriou | |
| 5,870,473 A | 2/1999 | Boesch et al. | |
| 5,878,140 A | 3/1999 | Chaum | |
| 5,889,863 A | 3/1999 | Weber | |
| 5,905,976 A | 5/1999 | Mjolsnes et al. | |
| 5,907,832 A | 5/1999 | Pieterse et al. | |
| 5,920,629 A | 7/1999 | Rosen | |
| 5,920,847 A | 7/1999 | Kolling et al. | |
| 5,924,084 A | 7/1999 | De Rooij | |
| 5,952,638 A | 9/1999 | Demers et al. | |
| 5,953,423 A | 9/1999 | Rosen | |
| 5,963,648 A | 10/1999 | Rosen | |
| 5,987,140 A | 11/1999 | Rowney et al. | |
| 5,991,412 A | 11/1999 | Wissenburgh et al. | |
| 5,995,626 A | 11/1999 | Nishioka et al. | |
| 5,999,625 A | 12/1999 | Bellare et al. | |
| 5,999,919 A | 12/1999 | Jarecki et al. | |
| 6,010,067 A | 1/2000 | Elbaum | |
| 6,014,636 A | 1/2000 | Reeder | |
| 6,014,646 A | 1/2000 | Vallee et al. | |
| 6,016,955 A | 1/2000 | De Rooij et al. | |
| 6,023,689 A | 2/2000 | Herlin et al. | |
| 6,026,375 A | 2/2000 | Hall et al. | |
| 6,026,379 A | 2/2000 | Haller et al. | |
| 6,029,150 A | 2/2000 | Kravitz | |
| 6,029,151 A | 2/2000 | Nikander | |
| 6,029,152 A | 2/2000 | Bublitz et al. | |
| 6,032,133 A | 2/2000 | Hilt et al. | |
| 6,047,051 A | 4/2000 | Ginzboorg et al. | |
| 6,047,067 A | 4/2000 | Rosen | |
| 6,061,664 A | 5/2000 | Pieterse et al. | |
| 6,070,150 A | 5/2000 | Remington et al. | |
| 6,076,073 A | 6/2000 | Pieterse et al. | |
| 6,078,907 A | 6/2000 | Lamm | |
| 6,081,790 A | 6/2000 | Rosen | |
| 6,085,321 A | 7/2000 | Gibbs et al. | |
| 6,088,683 A | 7/2000 | Jalili | |
| 6,105,013 A | 8/2000 | Curry et al. | |
| 6,119,227 A | 9/2000 | Mao | |
| 6,131,810 A | 10/2000 | Weiss et al. | |
| 6,145,079 A | 11/2000 | Mitty et al. | |
| 6,161,181 A | 12/2000 | Haynes, III et al. | |
| 6,175,922 B1 | 1/2001 | Wang | |
| 6,185,545 B1 | 2/2001 | Resnick et al. | |
| 6,199,052 B1 | 3/2001 | Mitty et al. | |
| 6,205,437 B1 | 3/2001 | Gifford | |
| 6,206,283 B1 | 3/2001 | Bansal et al. | |
| 6,243,689 B1 | 6/2001 | Norton | |
| 6,282,656 B1 | 8/2001 | Wang | |
| 6,289,322 B1 | 9/2001 | Kitchen et al. | |
| 6,311,171 B1 | 10/2001 | Dent | |
| 6,317,745 B1 | 11/2001 | Thomas et al. | |
| 7,729,984 B1 | 6/2010 | Nappi | |
| 7,805,376 B2 * | 9/2010 | Smith | 705/64 |
| 2001/0007983 A1 | 7/2001 | Lee | |
| 2001/0016835 A1 | 8/2001 | Hansmann et al. | |
| 2002/0120587 A1 | 8/2002 | D'Agostino | |
| 2003/0023552 A1 | 1/2003 | Kight et al. | |
| 2003/0110136 A1 * | 6/2003 | Wells et al. | 705/64 |
| 2004/0034594 A1 | 2/2004 | Thomas et al. | |
| 2004/0049456 A1 | 3/2004 | Dreyer | |

FOREIGN PATENT DOCUMENTS

| | | |
|---|---|---|
| EP | 0992960 | 4/2000 |
| EP | 0992960 A2 | 4/2000 |
| JP | 2001-067399 | 3/2001 |
| WO | WO 98/16911 | 4/1998 |
| WO | WO 98/34203 | 8/1998 |
| WO | WO 01/03090 | 1/2001 |
| WO | WO 01/11515 | 2/2001 |
| WO | WO 01/37172 | 5/2001 |
| WO | WO 01/39093 | 5/2001 |
| WO | WO 01/46880 | 6/2001 |
| WO | WO 01/48673 | 7/2001 |
| WO | WO 01/54028 | 7/2001 |
| WO | WO 01/54038 | 7/2001 |
| WO | WO 03/091849 | 11/2003 |

OTHER PUBLICATIONS

Winig, Eric; Jul. 20, 2001; Washington Business Journal, vol. 20, Issue 11, p. 21.*

Winig, "Cracking the Code," Jul. 20, 2001, Washington Business Journal, vol. 20, Issue 11, p. 21.

Card News, "American Express Debut One-Time Use Card Numbers to Cut On-Line Fraud," Aug. 22, 2001, Card News, vol. 16, Issue 16, p. 1.

"The Remaining Barriers to ePayments and Straight-through Processing." Research Conducted Oct. 2001-Mar. 2002. The Clearing House. Report released in 2002. http://www.epaynetwork.com/cms/documents/001786.pdf.

"University of Florida and Wachovia Bank Drive Electronic Payments for Grants." http://www.epaynetwork.com/cms/pressreleases/pr2004/000299.php Jun. 22, 2004. Electronic Payments Network. The Clearing House Payments Company, L.L.C.

Salaris, Rossana. http://www.usfst.com/pastissue/article/article.asp?art=270915&issue=214 "Moving corporate America to electronic payments". Financial Services Technology. US Edition. 2008.

Combined Federal Campaign of the National Capital Area. Catalog of Caring, 2008. Retrieved May 1, 2009, 150 pages. http://www.cfcnca.org/CatalogOfCaring.

United Way of the Greater Capital Region. "It's up to You!" Retrieved May 1, 2009, 4 pages. http://www.unitedwaygcr.org/tn/GetInvolved/SEFA.aspx.

* cited by examiner

EFFECTING FINANCIAL TRANSACTIONS

CLAIM OF PRIORITY

This application is a continuation and claims priority under 35 U.S.C. §120 to U.S. patent application Ser. No. 10/669,929, filed Sep. 24, 2003 now U.S. Pat. No. 7,729,984, which claims the benefit of priority of U.S. provisional application Ser. No. 60/414,073, filed Sep. 27, 2002, the entire contents of which are incorporated here by reference.

This description relates to effecting financial transactions.

One of the most fundamental institutions in human culture is banking. This institution allows an individual to place money in the safekeeping of a trusted third party. A major objective for doing this is that the third party holding the money is better able to prevent theft of the money than the individual himself. A second objective is that the third party can provide a whole range of services that allow money to be deposited, withdrawn and transferred to others in ways that are more convenient than the individual making transactions with actual currency. There are many additional incentives for banking as well such as interest paid on deposits. But a basic assumption underlying these objectives is that the money is being held in safekeeping or is being transferred in a secure way.

While banking is conducted every day by billions of people, there are some fundamental elements of the banking process that are taken for granted but are needed to make it work. These are often transparent to the consumer and taken for granted by banks and money processing institutions.

One of these fundamental elements is that currency placed on deposit by an individual is not actually stored for that individual as a physical object. When a deposit of currency is made, the value of the currency placed on deposit by an individual is recorded as a number which is associated with a financial account or DEPOSIT ACCOUNT. The physical currency is then mixed with the deposits that the bank receives from other customers. The deposit account is just a bookkeeping tool used to specify the value of current deposits that may be withdrawn by an individual. The account for each individual is identified with some type of symbolic identifier, typically called an ACCOUNT NUMBER. Transactions that move money into or out of the account are coordinated using this account number. The individual identifies transfers into or out of the account using paper, plastic or electronic instruments that bear the account number. In some cases, the account number may be associated with a person's name. In some cases, as in some Swiss banks, no such association is made.

Maintaining a financial account means providing book keeping or accounting services, either directly or indirectly, for a value of money. The actual value of money does not have to reside with the party that provides maintenance services. A bank, for example, maintains financial accounts. The bank takes deposits directly, holds money, and accounts for the value of the money held. An accountant, however, tabulates account values and may alter those values, but does not necessarily have responsibility for the value in the accounts.

Another basic element of the banking process is that account numbers are usually unique—one account number is associated with one deposit account.

Another basic element of the banking process is that the UNIQUE ACCOUNT NUMBER, along with a security element such as a signature, is the basis to move value both INTO AND OUT OF the account. A typical way that this is done is by the use of checks and deposit slips. To put money into an account, a deposit slip, which bears the account number, is submitted to the bank along with currency. To take money out of an account, a check is prepared stating who the money is going to and the amount. The check also shows the account number and the security element, i.e. a signature.

BACKGROUND

The Credit Only Principle

Figure 1:
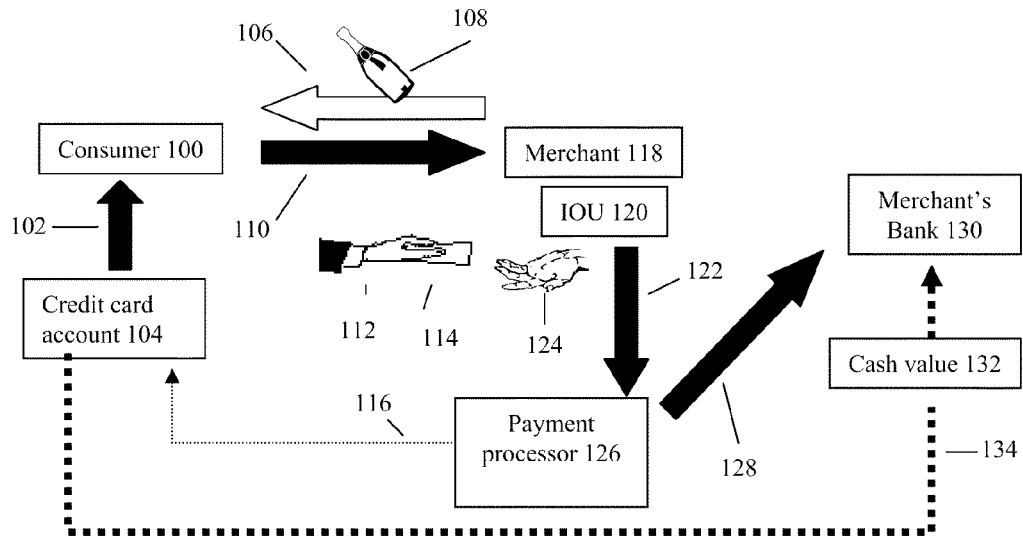
FIGS. 1 through 9 and 11 through 15 are schematic block diagrams.

An account identifier enables a presenting party to effect a transaction in an account based on presentation of the identifier. The conventional use of account numbers, or account identification, even though a universal social practice, has a serious flaw which creates a substantial security problem. The serious flaw is caused by the use of a single account identifier for both the deposit and withdrawal of money. In traditional financial transactions, a unique ACCOUNT NUMBER, or some unique account identifier, here called a general identifier, identifies the bookkeeping entry that represents the value in the account. This entry may be a numeric value on paper or a data value in an electronic storage device. The general identifier is used as the primary identifier both to deposit value (credit) and withdraw value (debit) from the same DEPOSIT ACCOUNT. The general identifier has typically been the account number used on checks and deposit slips or other documents to exchange value into or out of an account. Substantial flexibility can be added to banking and finance processes by using SEPARATE NUMBERS or identifiers for the credit and debit process.

The primary activity which raises security concerns with storage and transfer of value is the PROCESS OF WITHDRAWAL (debit). The basic concern an individual has with their bank deposit is unauthorized WITHDRAWAL of money. Because the account number is the access key to the value of the deposit, protection of this number is very important. Provisions must be put in place to keep account numbers secret and to add additional identification security to the use of account numbers. Checks that withdraw money from the account are printed under control of the bank and when used must have the signature of an authorized user who has provided samples of the signature on authorization cards. A drivers license or other identification is also often required to use checks or withdraw money and the user is often photographed. If a bank card is used, it must be accompanied by a PIN number.

A totally new relationship with the account is created, however, if a new identifier is established that only allows DEPOSITS or CREDITS to be made to an account. An individual has little concern if money is mistakenly or even maliciously put into their account.

Based on these observations, an entirely new money management process, referred to here as the CREDIT ONLY PRINCIPLE can be established. This process would allow a financial account, or any account that represents value, to be identified by MORE THAN ONE IDENTIFYING NUMBER. In this process, one or more numbers can be used ONLY TO DEPOSIT VALUE (credit) into the account. Other numbers or identifiers must be used to withdraw (debit)) value from the account.

The credit only principle primarily provides a method to protect the FINANCIAL ACCOUNT of a RECIPIENT of value.

Credit Only Identifiers

New account identifiers created by the Credit Only principle are referred to in this document as CREDIT ONLY IDENTIFIERS or CO IDENTIFIERS. A CO identifier allows value to be added to an account but does not allow value to be subtracted from the account.

CO identifiers themselves are not transactions. Transactions are changes in information or value which occur through a process. A CO identifier may give part of the information needed to complete a process, but is not the process itself. CO identifiers themselves are not processes. Processes create a change in information or value. The presentation of an identifier can enable a process to occur. Effecting a transaction in an account means performing a process that changes information about an account or the value of the account. A CO identifier can enable a transaction by providing information or permission for the transaction to take place, thereby enabling the transaction.

A CO identifier financial account is any financial account for which positive value adjustments are authorized based on the presentation of a CO identifier and a stated value amount to be credited. Each account held by a bank could allow CO identifier access and thereby be considered a CO identifier account. If cash or electronic money is presented to a bank with a valid CO identifier, then the value in the related account would be increased, however, no value reduction can be made using the CO identifier.

An important characteristic of CO identifiers is that there does not have to be only one for each account. A CO identifier financial account can have a plurality of CO identifiers. This means, one or more CO identifiers can point to or designate the same financial account and transactions using different CO identifiers can put value into a single financial account. Each CO identifier has to be unique from all other CO identifiers so that the account it points to is unique, but many different CO identifiers may point to a single financial account. CO identifiers may also point to other CO identifiers as long as a circular reference is not created.

A CO identifier account also requires at least one debit or general identifier so that value can be taken out of the account. Debit and general identifiers can also be plural, however, they require special processing to insure that multiple, uncoordinated withdrawals do not reduce the account value below zero. No such concern is needed for CO identifiers because CO identifier transactions can only increase account value. Special processing would be require to limit the upper value in an account if the upper limit is not unrestricted.

To maintain the secrecy of a general identifier, a CO identifier should be structured so that it is not easy to determine a general identifier from a CO identifier. An example of such a process is to create CO identifiers using a process that does not reference the general identifier as part of the process.

An important property of account identifiers is persistence. Persistence here means that an identifier remains unique over time, even as other similar identifiers are created in the future. CO identifiers can be made "persistent" by applying processes during the creation of the identifiers which do not allow duplicates to be issued. A principle which substantially simplifies such processes is the concatenation of a time code into the CO identifier.

Use of CO Identifiers

The risk associated with disclosure of account numbers and thereby access to the value in the accounts, has led to strong account number protection. An example where this practice is followed in the extreme is the protection many Swiss banks provide for connections between account identifiers and their owners. Because CO identifiers can only be used to deposit value into accounts, they do not have to be protected. They can be made fully public without fear of loss of value in the account. This would allow CO identifiers to be used with unsecured communications without exposing the finances of the holders of those accounts to theft. There are many advantages to hiding a general identifier and creating other identifiers that point to it to cause an action to occur.

Because CO identifiers can be plural, they can be used for many functions beyond the deposit of money. Many identifiers, each with separate functions, can still accomplish the basic function of transferring funds to a single account. This expands the general nature of CO identifiers because different identifiers which are applied in different situations can still point to a single financial account.

For example, in addition to representing the financial account, the account identifiers also indirectly or virtually point to the bank or institution that holds that account. Pointing, here means that under secure conditions, the general identifier can be determined from other identifiers through some process. A CO identifier being used with a request for payment, can also be used to identify a physical address of the institution holding the account. The address could be used to route physical financial instruments. A CO identifier being used to direct payment as part of a purchase transaction, can also identify the merchant holding the account. A CO identifier being used to direct payment as part of a purchase transaction, can also be used to specify many more aspects of the transaction, such as identification of items being purchased. This transforms CO identifiers into very general purchasing instruments and payment instruments.

The account identifiers also point to the merchant, individual, institution or firm that owns the account. A CO identifier account can be used for the accounting of almost all forms of financial value, including, for example: private, commercial, government and institutional financial applications. Financial accounts that can be accessed by CO identifiers can be held by, without limitation: merchants, businesses or enterprises, another bank, individuals, charities, any party associated with a commercial transaction or any party to whom a CO identifier is presented. One of the objectives of CO identifiers is to create broad access to a financial account without creating risk for that account. Given that access is restricted to a credit only transaction, there could be unlimited access to an account by any party to make a credit. The actual processing of the records of the account would still remain with the institution that maintains the account.

In summary, where the Credit Only principle primarily protects the recipient, the use of CO identifiers produces additional protection for a sender by protecting the value represented by a financial instrument during transmission, and also opens up many additional functions for the identifier.

There are potential business applications which may focus on CO identifiers themselves, without direct involvement in the final deposition in a financial account. A business service that does not hold money can still provide commercial value by transferring valid CO identifiers or portions of CO identifiers. The intermediary, in capturing information in transit, can provide fulfillment services or separation or aggregation accounting services for another. This would be the equivalent of a "lock box" service, often used for paper checks, which tabulates the data on the checks and handles paper transportation, creating a more usable data handling format. A typical example would be a web service that provides marketing services for a charity. Customers wanting to send money to the charity could send a donation request to the web service who could then forward an aggregation of requests to a processor, without processing the requests as a payments. They might take a fee for this service. An entity that might forward a CO identifier transaction could be: a merchant, a marketing firm, a payment processor, a purchase processor, a network, an aggregator or data service. An entity that might receive a CO identifier transaction could include: an intermediate processor, an aggregator or an institution.

Aggregation of financial identifiers means the collection of data contained by the identifiers or associated with the identifiers for the purpose of providing a service for others. Aggregation could also include disassociation of previously aggregated data, followed by a re-aggregation of the data in a different format. This service could include, for example simplifying, organizing, enumerating or managing the transport, processing, reporting or storage of the identifiers.

Because of their inherent security, CO identifiers can be made publicly accessible or available. Such availability could become very widespread. There are many processes that can be used to do this, including, without limitation: publishing, distributing or selling aggregates of CO identifiers in lists, directories or books of printed material or computer readable media; display of CO identifiers in places accessible to consumers; placing aggregates of CO identifiers in computer memory or storage which is accessible to networks, the Internet or interactive voice response systems; having people in call centers provide CO identifiers in response to callers, providing special search software to find CO identifiers.

The Context Sensitive, Concatenated Identifier and Apparent Identifier Principle Because of the very large number of consumers, merchants and products involved in world commerce, relatively large identifiers are needed to uniquely identify each of them. Examples of numbers used for consumers, merchants and individual products are given here:

Consumers: A typical financial instrument is a personal check. Another is a personal credit card. There are a very large number of people in the world who use these instruments. In order for each user to be uniquely identified, the identification code for each, which is usually a number, must be large. To simplify automatic processing, an even longer number is desirable. A personal check, in the U.S., typically has a 23 digit identifying number. This includes a routing number (also called a transit number), an account number and a check number. A credit card typically has a 20 digit identifying number which includes a 16 digit identity number and 4 digits for expiration date. Because these numbers are so long, it is not practical for people to remember them or present them one digit at a time. To make the use of the numbers more convenient, mechanisms have been implemented by industry, like the plastic credit card with magnetic stripe and card reader, to free the consumer from having to handle the numbers. There are other "people related" number systems, not directly used for consumer payments, that also show the need for long numbers. One is the social security number, a 9 digit number, and the telephone number, a 10 digit number for use internal to the United States and up to 16 digits when making international calls.

Merchants: A 9 digit employer I.D. number (EIN) is used by U.S. state and federal governments to identify merchants for tax purposes. If merchant identification is considered in a broad sense, the most universal identifier is probably the spelled out company name. With spelling, company names as short as three characters, IBM for example, can be sufficient to uniquely identify a merchant. But in most cases, the identifier is much longer, with 29 characters not being unusual, Commonwealth of Massachusetts, for example.

Products: Most goods in U.S. commerce are identified using a standard code called the UPC (Universal Product Code) which is a 12 digit number. Because the number is long and would be difficult for people to interact with, automated methods have been developed to read the numbers. One common method is the bar code. The first 6 digits of the UPC are used to identify the product manufacturer. The combination of manufacturer ID (first 6 digits) and product ID (5 digits following the manufacturer ID) combine to form a unique product identifier.

But, despite the ubiquitous use of these numbers by government and industry in commerce, none of them, nor any other numeric or alpha numeric system, is directly used by consumers whereby the consumer directly enters the identifier in a purchasing transaction. Alphabetically spelled out company and individual names might be thought to be an exception to this statement. They are not, however, because, as used today, company and individual names are not unique.

A factor which must be considered in providing uniqueness for identifiers is PERSISTENCE. Identifiers are used in commerce as an element of a transaction. Typically, a record of that transaction is made and stored for later use. For a system of identifiers to be useful, the identifiers must not only be distinct at the time they are created, but they must remain distinct into the future.

Two of the strongest drivers of consumer acceptance for products and services are CONVENIENCE and EASE OF USE. The typical financial and product related identifiers in current commercial use, examples of which were given above, are too large and too abstract for the average consumer to use directly. This has been one of the major factors discouraging the use of portable communication devices like cell phones for making consumer purchases. To overcome the inconvenience and difficult use imposed by long identifiers, a number of processes have come into widespread practice that inherently reduce the size or complexity of the identifying numbers. These processes usually appear transparent to the consumer. They are generally taken for granted by industry as well. The processes are used so often and are so transparent that they appear to be fundamental parts of making payment transactions.

One of these fundamental processes is to use the CONTEXT in which a transaction is taking place to inherently restrict the size of the set of object that need to be identified. An example of this is the use of catalogs of company products for remote purchases. Because a company publishes a catalog which contains only the products that it manufactures or distributes, or even a smaller subset of these items, the number of items that need to be identified, within the CONTEXT of that catalog, is greatly reduced from the universe of all possible products in the world. For example, a catalog with 1000 items could uniquely identify each with 3 identity digits, 000 through 999 for example. If the identifier could be characters instead of numbers, that is either numbers or letters, then 2 characters, 00 through ZZ, are sufficient to identify 1296 items.

In order, however, for this small identifier to be used to adequately identify specific items during a purchasing transaction, other processes must also be employed simultaneously. To uniquely identify the items in the catalog, the consumer must also, somehow, identify the specific catalog that is being used. The merchant must take this catalog identification information into account when processing the order. The actual item identifier is then a combination (CONCATENATION) of the catalog or subset identifier with the item identifier. On an order form provided for use by the consumer, for example, the catalog identifier might already be printed. The consumer enters only the short item identifiers. The manufacturer's agent thereby uses CON- TEXT to restrict the quantity of items in a set and CONCATENATION of the set identifier (catalog identifier) and item identifier (item number) to uniquely identify the selected item.

CONTEXT and CONCATENATION are frequently employed to reduce the size of the APPARENT IDENTIFIER. In the previous example, the actual identifier is quite long. The identifier for each item is made up of a concatenation of a catalog identifier and an item identifier. But, because of the way the information is presented to the consumer, the two identifiers are not dealt with the same way. The catalog identifier may be printed on an order form sent with the catalog and never even be noticed by the consumer. In this case, only the item identifier is apparent to the consumer. In processes where a consumer sends a large identifier but is only aware of a subset of the identifier, the subset can be considered an APPARENT IDENTIFIER.

Another example of the apparent identifier process is the use of symbols or processes that are already familiar to the user as contexts. These can be used either alone or in combination, to create context identifiers that are quite long, but in ways that the consumer, and often the merchant as well, are not aware of. For example, as part of the ordering procedure for a particular catalog, the consumer is told to place an order using a specific phone number which the merchant has established for that catalog. The customer service people answering that phone number have order sheets which convert the item identification numbers in the catalog into much larger manufacturer stock numbers. The telephone number thus becomes an indirect part of the identification. To place an order for one item with just a 2 character identifier, the consumer can be considered to be entering a twelve character identifier composed of a 10 digit telephone number and a 2 character item number. But in the consumers mind, this only appears to be a 2 character transaction. The 10 digit telephone number is not interpreted to be part of the item identification process. The consumer also handles the 10 digit telephone number relatively easily because it is a process that has been learned in our culture.

In Summary:

One or more CONTEXTS can be applied to identifiers used to uniquely identify financial accounts, merchants, products and services to reduce the size of the identifiers needed to identify individual items by creating subsets. These CONTEXTS can be extended beyond the typical association catalogs make with a merchant or item set to include associations based on location, time and personal associations.

Long item identifiers can be created by the CONCATENATION of short item identifiers, of which one or more may not be apparent to the user.

Convenience and ease of use are not identically associated with short data entry. Large identifiers can be created, which are easy to remember and convenient to use, by concatenating small identifiers, each of which is significant to the user and easy to remember, based on PSYCHOSOCIAL FACTORS. Psychosocial factors are generally context attributes related to the experience of the individual that have familiar structures such as names, dates, locations or some personal association.

Identifiers, which involve PSYCHOSOCIAL FACTORS related to the existing culture and available skills in the population, make some elements of an identifier APPARENT to the user while other elements of the identifier, even though directly handled by the consumer, are not apparent.

CHARACTER BASED IDENTIFIERS which use letters and numbers can create account identifiers that are easier to remember and may be more compact than identifiers composed of numbers alone.

PERSISTENT identifiers can be created by concatenation of a time code into the identifier.

A major benefit of this new process is that consumers can identify goods, services, financial accounts and merchants, using electronic communication devices, in ways that appear to require minimal data entry, and thereby are viewed as convenient and easy to use.

Security by Associating a Device Identity and Payment Account

In existing purchasing processes that use modern financial instruments like credit cards, there is still an implicit, fundamental, socially based model that underlies the process: the physical handing of a payment from a purchaser to a merchant. This model established the basic structure for most current money transfer instruments. The model starts with value carried by an individual. The value carried by an individual is extended by establishing an association between the individual and a bank or financial institution which includes setting up a financial account for the individual. The value in the account is a virtual extension of the value carried by the individual. The account is typically accessed by an account number. A check, debit or credit card is a physical representation of an account number, carried by the individual, to access the virtual value in the individual's account. When a payment is made, the check or payment card is physically handed from the consumer to the merchant, mimicking the age old process of payment.

The development of many modern financial instruments like checks and credit cards was based on a model whereby value was physically transferred directly from consumer to merchant. The structure of the transaction processes related to these instruments is based on the physical transfer principle underlying the instruments themselves. These structures therefore exhibit many of the security and convenience liabilities of the instruments as well.

With the introduction of new technologies, like the Internet, there have been numerous attempts to adopt the existing instruments. This is not always successful. Considering credit cards as an example, the card can not be physically passed from consumer to merchant over the Internet. For Internet payment transactions, the number represented by the card is passed as data. Because using the Internet, the data is sent over unsecured communication channels, new security problems are introduced that were not present in the direct physical hand-to-hand transaction upon which the card was developed.

The fundamental model of a direct physical hand-to-hand transaction can be seen in the flow of a typical payment as shown in FIG. 1. A consumer 100 wishes to make a purchase from a merchant 118. The consumer is not carrying sufficient cash for the purchase and therefore decides to use virtual cash by using a credit card 114. Virtual cash is shown in FIG. 1 by large solid arrows. The consumer making the purchase has sufficient credit for the purchase in a credit card account 104. Virtual cash, shown as arrow 102, flows from the credit card account 104 to the consumer 100. To make a payment, value flows from the hand of the consumer 112 to the hand of the merchant 124. The transfer of virtual cash is shown by arrow 110. The trade of value is direct from consumer to merchant. The merchant responds by handing goods 108 directly to the consumer. The merchant—consumer relationship in this model, shown by arrow 106, is strong.

When the merchant receives the consumer's virtual cash, another model, which is just as fundamental, can be added to explain how the payment is completed. In this second model, the merchant has not actually received payment of cash. Instead, the merchant has received virtual cash which can be viewed as an implied IOU 120 for goods tendered. A financial institution, shown here as payment processor 126, has agreed, for a fee, to settle the financial details. Virtual cash 122 is passed from merchant 118 to payment processor 126. Payment processor 126 instructs the credit card account 104, via an electronic communication channel 116, to pay merchant bank 130 thereby transferring virtual cash 128 to the merchant's bank 130. The cash value 132 is actually transferred from the credit card account 104 to the merchant's banks 130 through electronic processing or paper transfers as shown by arrow 134.

Figure 2:
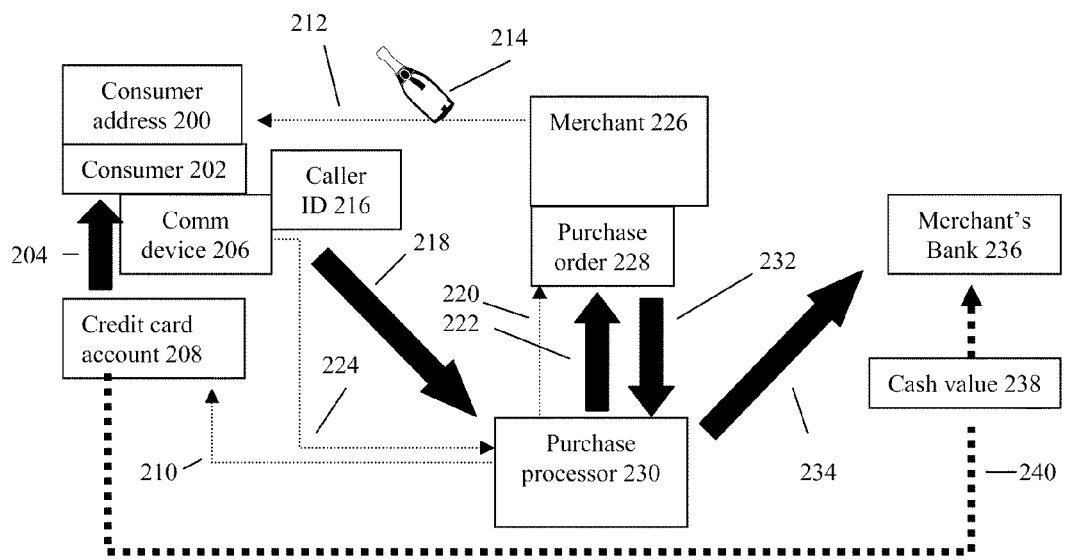

History has shown that new approaches designed specifically to use the unique features of new technologies may exhibit substantial advantages over attempts to apply older practices with the new technologies. A new communication technology based payment system using CO identifiers is shown in FIG. 2. It is based on a substantially different model from the hand-to-hand transfer model shown in FIG. 1. The payment system using CO identifiers is based on a remote purchase model with remote transfer of payment and third party delivery of goods.

In this new model, a purchase transaction is initiated by consumer 202 for a specific item of goods 214. The specific merchant or distributor may not be known to the consumer. The purchase transaction is conducted with a third party agent, shown here as a purchase processor 230. The purchase processor 230 receives purchasing instructions from the consumer 202 through a communications channel 224. The communication channel includes a communications device 206. The purchase processor 230 takes on the role of a purchasing agent and places an order for goods with a merchant 226. The purchase processor has now become the merchant's customer. The merchant has now become a fulfillment service for the purchase processor. The purchase is made against a purchase order 228 and goods 214 are shipped to an address 200 specified by the purchase processor. In this model, the merchant—consumer relationship, shown by arrow 212, is weak. The purchase processor also instructs 210 credit card account 208 to pay the merchant's bank 236. The credit card account 208 transfers cash value 238 to the merchant's bank 236 over an electronic channel 240. Account 208 from which value is taken by the credit card company is based on instructions from purchase processor 230 which in turn were based on a consumer identifier received in a message over communications channel 224. The consumer identifier was assumed to have originated with communications device 206, which accurately generated the identifier and which is assumed to be under the authorized use of a specific consumer 202.

Transfer of virtual cash is very different in this communications model from the model shown previously in FIG. 1. Virtual cash is shown in FIG. 2 by large solid arrows. The consumer 202 receives virtual cash 204 based on value in a credit card account 208. The consumer's virtual cash 218, however, is no longer directly transferred to the merchant. It is now transferred to purchase processor 230. The purchase processor transfers virtual cash 222 using electronic communication 220 to merchant 226 using purchase order 228. The merchant sends virtual cash 232 back to purchase processor 230. Purchase processor 230 instructs credit card account 208 to pay merchant bank 236, thereby transferring virtual cash 234 to merchant bank 236. The credit card account backs the virtual transfer by sending cash value 238 over an electronic communication channel 240 to merchant bank 236.

The connotation of transferring value in this model to a merchant only occurs as a remote transaction, depicted as the two step 218, 222 virtual cash transfer. Where the traditional credit card transaction is implemented based on transferring value from consumer to merchant, the communication technology based payment system using CO identifiers is implemented based on transferring a COMMUNICATIONS DEVICE IDENTITY from a communications device to a PURCHASE PROCESSOR and the ASSOCIATION OF A PAYMENT ACCOUNT with a COMMUNICATIONS DEVICE IDENTITY.

In the CO identifier model, the consumer is not directly identified for basic processing. Only the communications device is identified. This is done using caller ID 216 or a device registration number or some other identifier built in an unique to the communications device. Identification of the communications device user is an extra step that may only be required in a few cases. One such case is "cash and carry" purchases.

In summary, for traditional payment methods, the merchant transfers the consumer's actual account number along with a stated payment value to a processing center; the processing center, using identifying digits in the card number, forwards the identification number and payment value to the consumer's card issuing bank. The consumer is normally required to prove identity through a manual signature and separate paper handling process. If the information portion of such a transaction is conducted over an unsecured communications channel, the account number is subject to theft.

With CO identifiers, a communications device transfers its own identity to a processing center. A CO identifier and payment value are also transmitted; a bank card identification number is associated with the transmitting device identification; the card identification number and payment value are forwarded to the users card issuing bank. The user is generally not identified. This transaction can be conducted over an unsecured communications channel, without encryption, without fear of exposing the user's account number.

In Summary:

The conventional use of account numbers, or account identification, such as credit card numbers, even though a widespread social practice, has serious flaws which limit flexibility and create substantial security problems. The serious security flaw is caused by the transmission of an account identifier over unsecured communication channels which is sufficient to access value. Substantial security can be achieved, even with unsecured transmissions, by replacing financial account numbers with device identifiers.

In modern purchase transactions, an ACCOUNT NUMBER, or some unique account identifier, that represents value held by a consumer, is still used as the primary identifier to transfer value from the hand of the consumer to a merchant.

The primary activity which raises security concerns during financial transactions conducted over unsecured communications channels is the transmission of ACCOUNT NUMBERS, or identifiers that can ACCESS VALUE. Substantial security can be achieved by transmitting a CONSUMER IDENTITY NUMBER, or identifier, which alone is insufficient to access value, instead of an account number.

Substantial security can be added to the purchasing processes by using a DEVICE IDENTITY NUMBER, or device identifier as the primary identifier for payment transactions instead of account numbers.

Substantial flexibility can be added to the purchasing processes by using a DEVICE IDENTITY NUMBER, or device identifier as the primary identifier for payment transactions instead of account numbers.

For telephones or electronic communications devices, the CALLER ID or DEVICE REGISTRATION NUMBER can be a sufficient device identifier.

Figure 3:
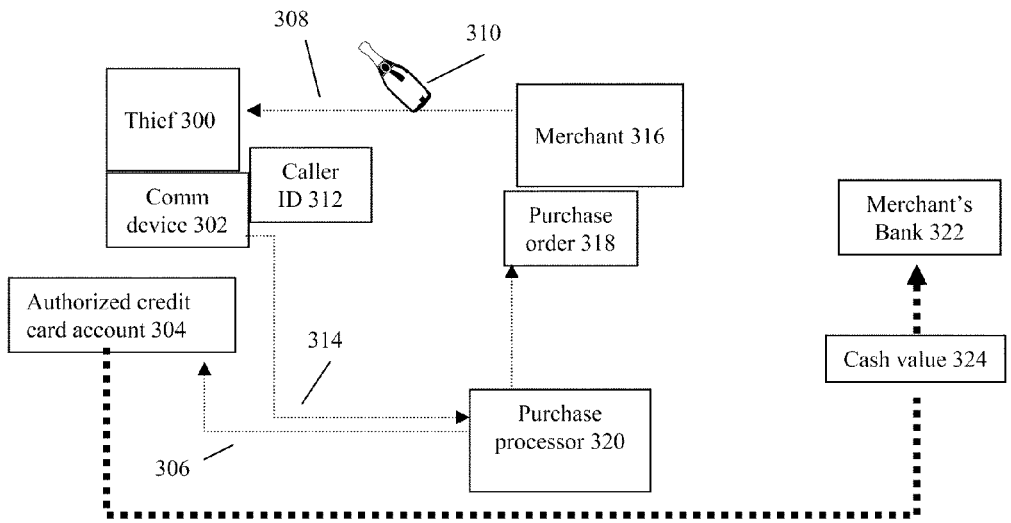

Security by Associating a Payment Account with a Securely Selected Delivery Address One of the problems introduced by a modern, communications based purchasing system and the use of caller ID or a phone registration number to identify a purchaser account, is exposure to theft of the communications device. If the communications device is used by a person not authorized to use it, a fraudulent purchase could be made. An example of how a theft can be accomplished in a modern communications based purchasing system using caller ID is explained using FIG. 3. In FIG. 3, thief 300, has just stolen communications device 302 and is attempting to fraudulently obtain merchandise 310. The thief activates the communications device which the authorized owner has preprogrammed with all required access information. The communications device establishes a communications channel 314 with a purchase processor 320. The communications device sends its caller ID 312 to the purchase processor 320. Using additional merchandise identification information, the thief completes an order for the desired merchandise. As part of the process, the purchase processor 320 places a purchase order 318 with merchant 316. If this was a "cash and carry" situation where the thief could immediately take possession of the merchandise, the merchant 316 would hand merchandise 310 directly to the thief 300, as shown by arrow 308, and the thief would take it and leave the purchase location, having gained the value of the merchandise. However, the purchase processor 320 would have electronically 306 authorized payment from the authorized credit card account 304 belonging to the authorized owner of the communications device 302, to the merchant's bank 322 transferring cash value 324. The result is that the thief would have been rewarded for the fraudulent use by obtaining merchandise for which he did not pay. The payment would have been taken from the authorized users account.

Figure 4:
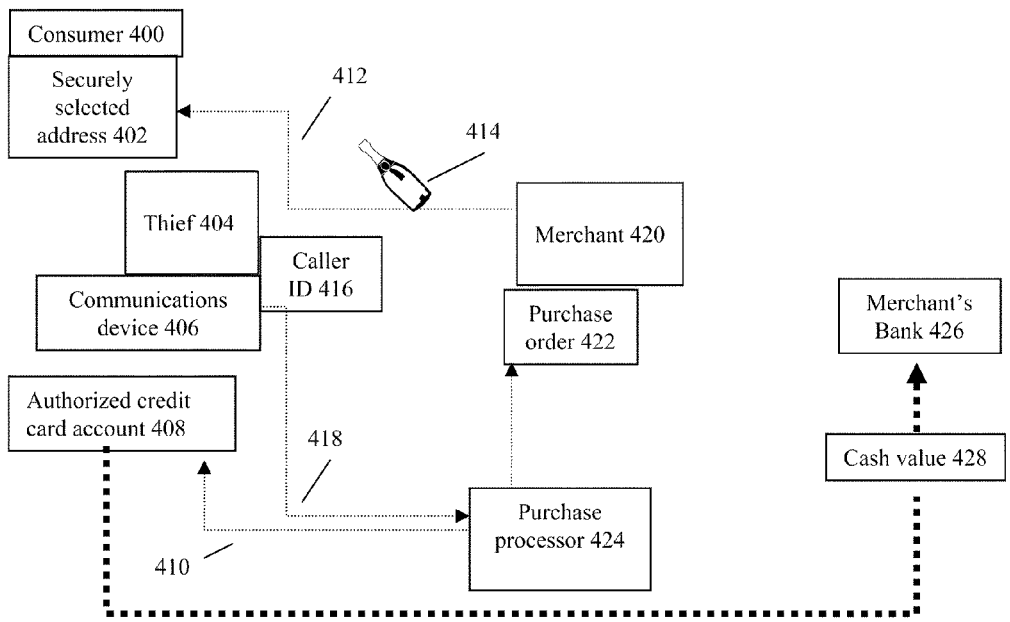

If the same scenario is used with one critical change, the result can also be changed. FIG. 4 shows a similar attempted fraudulent use, but in the case of FIG. 4, the merchandise is shipped, rather than taken at the point of purchase. The critical change in the process is that the shipment address is a securely selected address which is logically linked to the payment account.

In FIG. 4, thief 404, has just stolen communications device 406 and is attempting to fraudulently obtain merchandise 414. The thief activates the communications device which the authorized owner has preprogrammed with all required access information. The communications device establishes a communications channel 418 with a purchase processor 424. The communications device sends its caller ID 416 to the purchase processor 424. Using additional merchandise identification information, the thief completes an order for the desired merchandise. As part of the process, the purchase processor 424 places a purchase order 422 with merchant 420. Because this is a "ship to address" purchase, the merchant 420 ships merchandise 414 to a securely selected shipping address 402, as shown by arrow 412. Thief 404 has been bypassed, does not receive the merchandise and thereby gains no value from the effort. To be sure, the purchase processor 424 would have electronically 410 authorized payment from the authorized credit card account 408, belonging to the authorized owner of the communications device 406, to the merchant's bank 426 thereby transferring cash value 428. However, though inconvenient, the consumer 400, who unexpectedly obtained merchandise 414, can send it back to merchant 420 and get the cash value 428 refunded. The result is that a thief would still be exposed to legal action for fraudulent use but would NOT be rewarded for the fraudulent use, thereby making this practice impractical. Also, the consumer and merchant, although inconvenienced by the event, could both recover the value of the merchandise and thereby not be subject to substantial loss.

In Summary:

The reward of fraudulent use of credit card or account information is DELIVERY OF VALUE TO THE FRAUDULENT USER. This can be denied by LINKING A PAYMENT ACCOUNT to a SECURELY SELECTED DELIVERY ADDRESS. The payment account may be obtained from the identifier of the communication device.

In such a system, consumers could have multiple delivery addresses and chose among them during the purchase process, while still maintaining security, as long as all selectable addresses were selected using a secure process. Consumers could make changes in delivery addresses as long as the process used to change addresses was secure from fraudulent use.

Figure 5:
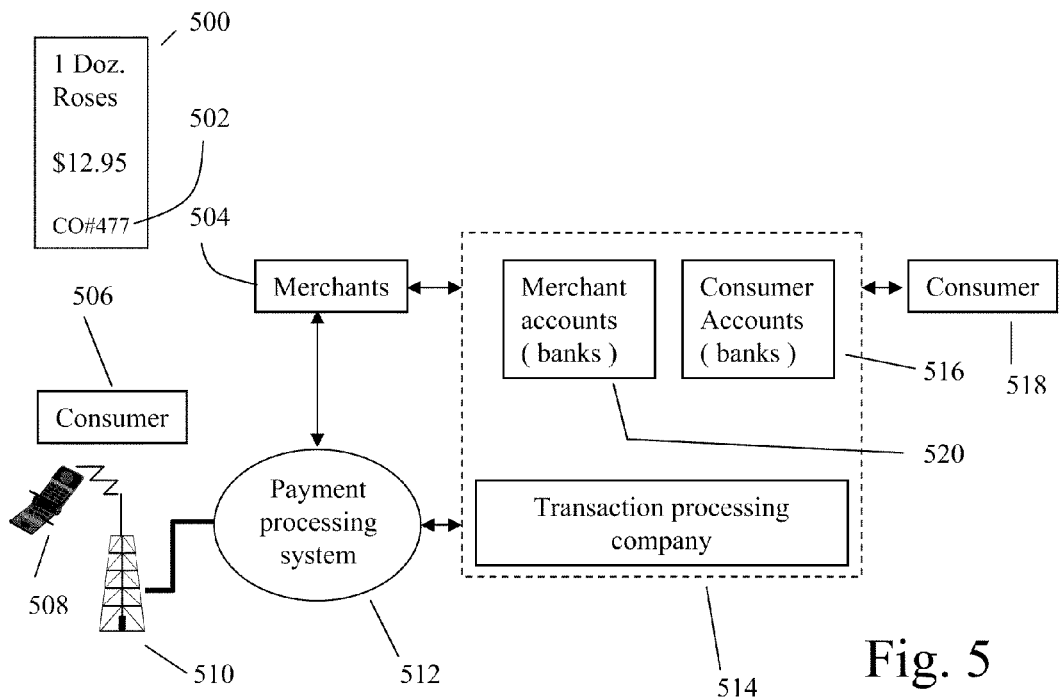

Structure of a Consumer Purchasing System Using the Credit Only Identifier Principle FIG. 5 shows an overview of a basic consumer payment system implemented with CO identifier principles. The objective of FIG. 5 is to show the steps of one method by which a consumer can make a purchase using a cellular telephone. In FIG. 5, a consumer 506 wishes to make a purchase using a cell phone 508 as a payment device. For purposes of this example, the item to be purchased will be a flower arrangement of a dozen roses being advertised on a billboard 500 in a rose garden. The consumer is sitting on a park bench in the rose garden. The flower arrangement will be delivered to the consumers home.

Prior to ordering any merchandise or services using the CO process, the consumer will have had to contact a call processing service 512 and provide the service with identity, payment and merchandise delivery information. For the example shown in FIG. 5, the identity information might be simply the consumers cell phone number, the payment information might be the consumer's credit card number and expiration date, and the deliver information might be the consumer's home address. This information only needs to be presented to the call processing service a single time. The process of providing this information would typically be referred to as "consumer registration" and the information provided would typically be referred to as "consumer registration information." Also, prior to ordering merchandise, a merchant 506 will have had to contact a CO identifier sales service (to be discussed later) to obtain a CO identifier 502 for the particular item or service being advertised. In this example the CO identifier 502 is the number "477". The process of providing this information would typically be referred to as "merchant registration" and the information provided would typically be referred to as "merchant registration information."

To purchase the flower arrangement, the consumer 506 activates the cell phone which has been registered with the call processing service 512. The consumer selects a pre-stored number from the phone's auto-dial index which is the telephone access number for the call processing service 512 and calls the service. The phone call is routed through the conventional public telephone system 510 to the call processing service 512. After completion of call processing (to be discussed later), the call processing service 512 sends information concerning the amount of money and mechanism of payment to a conventional transaction processing company 514. The transaction processing company 514 would then arrange payment settlement between the consumer's bank 516 and the merchants bank 520. The result is the transfer of money from the consumer's bank or credit account to the merchant's bank account. After completion of call processing, the call processing service 512 would also contact the merchant 504 and send fulfillment details for the purchase such as specific item to be purchased, number of items, payment amount and delivery information.

Therefore, using a system as shown in FIG. 5, a consumer, using only a cell phone, can place a call from anywhere that has cell phone service and place an order for goods or services without ever interacting directly with a merchant. An order for the goods or services will be sent to a merchant for fulfillment. A financial account of the consumer specified during consumer registration will be debited a charge for the goods and services. A financial account of a merchant specified during merchant registration will be credited for the goods or services ordered. All of these activities can be conducted safely using unsecured radio transmissions and the effort required by the consumer to place the order is very simple.

Figure 6:
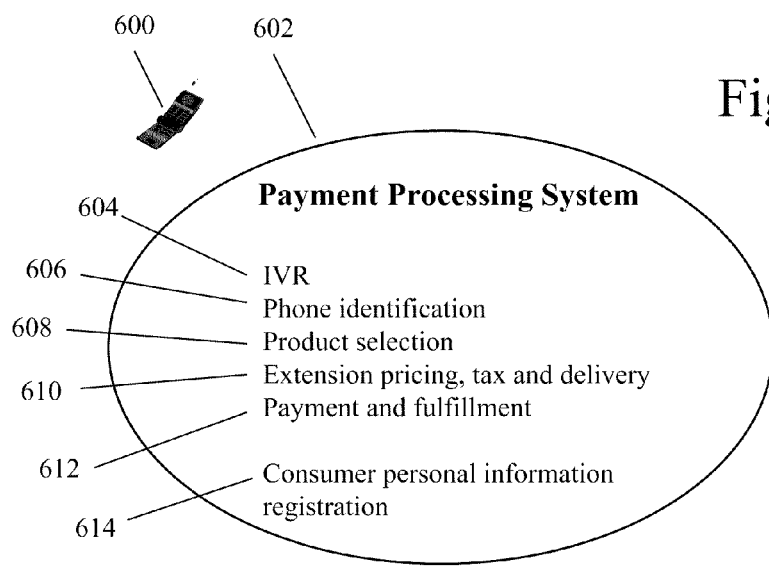

FIG. 6 expands call processing process 512 referred to in the discussion of FIG. 5 as the payment processing system element 602. The payment processing system 602 shows the basic elements of a process for handling consumer calls using CO identifier principles. The objective of FIG. 6 is to show the steps of one method by which specific information is determined during a payment transaction call. FIG. 6 also assumes the model of a consumer, sitting on a park bench, using only a cell phone, purchasing an item advertised on a billboard using only the cell phone, without ever interacting directly with a merchant, and having that item delivered to their home.

In FIG. 6, a call is received from the consumer's cell phone 600 by the call processing service 602 using an Interactive Voice Response (IVR) system 604. The IVR system provides an audio confirmation to the consumer of receipt of the call such as, "Hello, this is xyz payment processing service." The identity of the phone is determined by a phone identification process 606 that makes use of caller ID or the cell phone internal registration number. The phone identification process also determines the location of the phone and the current time. The actual identity of the caller may not be needed or verified during this process. After determination of the identification of the phone, IVR system 606, using an audio message, requests a transaction processing number, using a message such as, "Please enter your transaction processing number." The consumer is expected to enter a transaction number at this point which is a CO identifier, "477" in the example of FIG. 5. The identity of the product or service desired by the consumer is determined by a product selection process 608 based on the entered CO identifier using the CO identifier, time, location of the phone and phone identification according to the methods disclosed in this document. Once the product or service is determined, which may include a plurality of items, an extension pricing, tax and delivery process 610 computes the total payment due and requests confirmation from the customer. This may be accomplished with an audio message such as, "Your total order includes x,y,z and the total payment will be $xx.xx. If this is acceptable, please press 1." If an acceptable confirmation is received, the IVR system would close the connection after playing a closure message such as, "Thank you for your order." At that point, a payment and fulfillment process 612 would complete two transactions. A payment transaction would be sent to a conventional payment processor which tells the processor what bank account to debit (the consumer's account) for this transaction and where to send the money (the merchant's account). A fulfillment transaction would be sent to a merchant telling them what product or service to send and where to send it.

It is assumed that prior to use of the CO process, a consumer personal information registration process 614 will have been performed using a secure method, to obtain personal information for the consumer. During this preliminary contact, the consumer will need to give the service information consisting of at least: a. phone number of the cell phone; b. a delivery address for items purchased which will be associated with that specific phone number; and c. information concerning method of payment, which can be a checking account, a debit card, a credit card or some other mechanism.

Figure 7:
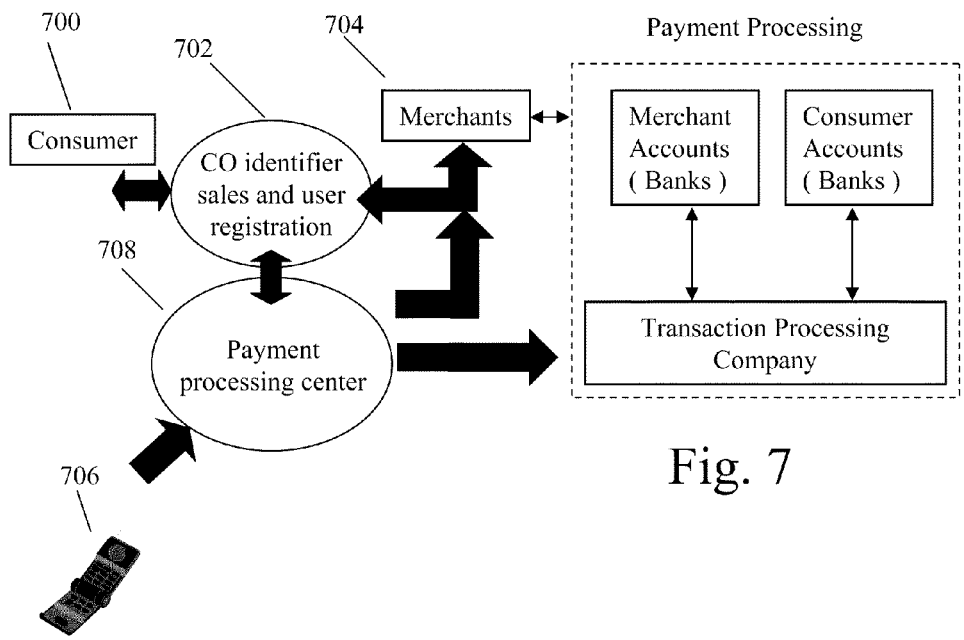

FIG. 7 expands FIG. 5 by adding CO identifier sales and user registration element 702 to show where creation of CO identifiers and processing of user registration could be handled in an overall system. Specifically, FIG. 5 shows how the CO identifier principle is used by a consumer to make a purchase. But before the purchase process can occur, there is a substantial amount of preliminary effort needed to collect user information and to create and distribute CO identifiers. FIG. 7 shows the sales and registration element 702 that manages the preliminary effort. FIG. 7 also shows that the sales and registration element 702 interacts with consumers, merchants and the payment processing system.

One of the links in FIG. 7 is between a sales and registration element 702 and a payment processing system 708. The reason for this link is that to process calls from consumers, the process needs a list of CO identifiers and their associated information. The sales and user registration element 702 would have the responsibility to generate this list and pass the list to the payment processing system 708.

Figure 8:
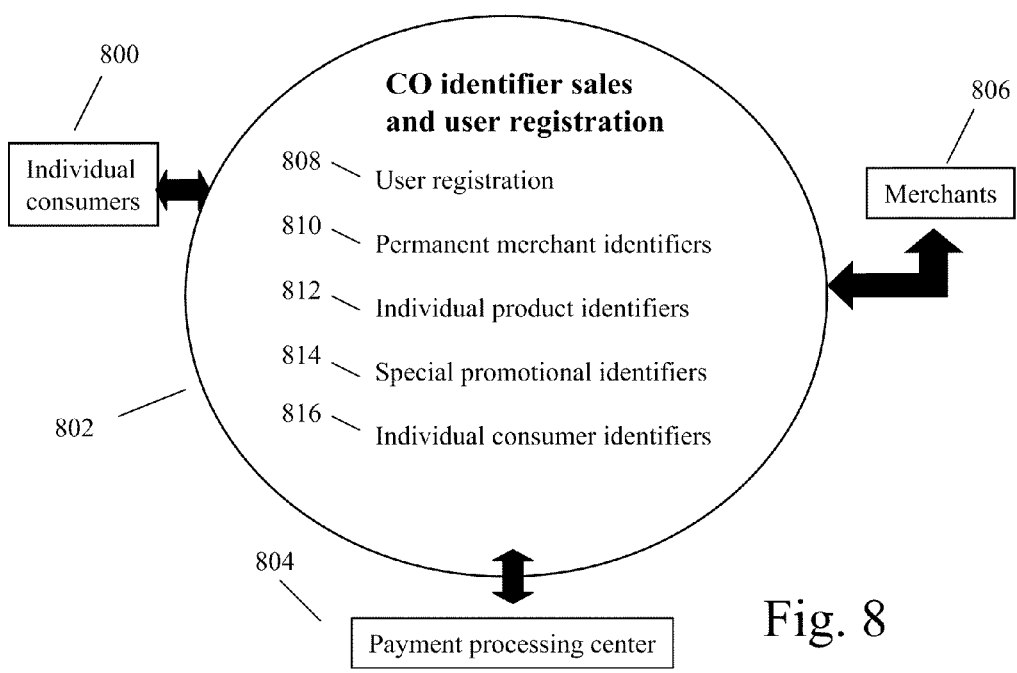

The other links to the sales and registration element are discussed in relation to FIG. 8.

Categories of CO Identifiers

CO identifiers can be applied in multiple ways. The multiple uses include four general categories that can be used to organize the uses: permanent CO identifiers, individual product identifiers, special promotional identifiers and individual consumer identifiers.

FIG. 8 shows these four categories as four basic functions needed to establish relationships between CO identifiers, merchants and individual consumers. FIG. 8 also shows that the four functions might be considered as basic divisions of a sales organization 802, here called CO identifier sales and user registration, which performs processes to select the identifiers and establish relationships between the CO identifiers, merchants and individual consumers. Sales organization 802 was shown previously in FIG. 7 as sales and user registration element 702.

One such function is the establishment of permanent CO identifiers 810. Permanent CO identifiers identify specific payment accounts for individual merchants, charities or specific institutions. The identifiers are referred to as "permanent" to imply that these identifiers will not be frequently changed. They may eventually become brand identified with the merchant, charity or institution. For example, a major U.S. merchant like Sears, might be assigned the CO identifier "500" or the IRS might be assigned the CO identifier "1040". Payment transactions with Sears or the IRS could use this number by itself or in combination with additional information. A major charity like the Red Cross might be assigned the CO identifier 100. Donations to the Red Cross could be made using the "100" identifier by itself or in combination with additional information. The selection of primary identifiers would be done based on logical and financial considerations from a relatively restricted list of numbers or alpha numeric symbols. The key characteristics of primary identifiers are that the identifier for each merchant, charity or institution be distinct and that the selection is only done infrequently, once in many cases.

A second function of the sales process is the establishment of individual product identifiers 812. Individual product identifiers identify individual product items and an associated payment accounts for those items. Selecting these identifiers is a very complex process because of the very large number of products in use, the variable lifetime that the products are available, and the need to keep the CO identifiers short. The task of the sales organization is to coordinate the creation of the CO identifiers with merchants using all of the size reducing mechanisms disclosed in this document. The key characteristics of product identifiers are: variable lifetime but typically longer than a few weeks, usually associated with a specific manufacturer, may be associated with specific points of sale at specific locations, or are advertised in specific media.

A third function of the sales process is the establishment of special promotional identifiers 814. Special promotional identifiers identify individual product items and associated payment accounts for those items. Selecting these identifiers is a somewhat complex process because of the large number of promotions that can occur simultaneously and the need to keep the CO identifiers short. The task of the sales organization is to coordinate the creation of the CO identifiers with merchants using all of the size reducing mechanisms disclosed in this document. The key characteristics of special promotional identifiers are: short lifetime typically shorter than a few weeks, usually associated with a specific manufacturer or merchant, may be associated with specific points of sale at specific locations, or are advertised in specific media.

A fourth function of the sales process is the establishment of individual consumer identifiers 816. Individual consumer identifiers specify accounts of individual consumers. This is a somewhat complex process because of the large number of individuals in the world and the need to keep the CO identifiers short. The task of the sales organization is to coordinate the creation of the CO identifiers with individuals using all of the size reducing mechanisms disclosed in this document. The key characteristics of individual identifiers are: long lifetime, typically longer than a few weeks, usually associated with a single individual, changing association circumstances, and account portability.

FIG. 7 shows how CO identifier sales and user registration 702 fits into the overall structure of a business process incorporating the CO identifier principle. Specifically, CO identifier sales 702 creates identifiers in cooperation with and for use by individual consumers and merchants. The identifier relationships are then provided to a payment processing center 702 for use in processing consumer requests.

General Properties of Co Identifiers

CO identifiers may not always be presented or transmitted in their entirety because of the use of the context sensitive, concatenated identifier principle and the apparent identifier principle. In fact, in most cases to achieve the goal of user simplicity, only a partial CO identifier would be used. To determine a complete identifier from a partial identifier, a process would be used. Because each CO identifier has the ability to be coded within itself for a separate process to decode it, the number of processes used to translate CO identifiers can be very large. Two typical processes might be table lookup and concatenation of separate elements. The process would be appropriate to the circumstances and context in which the CO identifier was used. Examples of such processes are given in detail elsewhere in this patent.

Because a CO identifier only allows value to be added to an account, it does not have to be protected. It can be made publicly accessible and widely used. A CO identifier, in addition to pointing to a general identifier and therefore a financial account, can also be used to specify other attributes in transactions that transfer value. Examples of such attributes include: an identity, a shipment address, phone number, personal information or commercial information. In addition to specifying attributes, a CO identifier can also carry functional information to initiate and control actions. Because the actions are dependent on the content of the identifier itself, and the fully concatenated identifier can be very large, the potential number of actions can also be very large. Not all uses can be envisioned at this time. Examples of categories of actions that a CO identifier can initiate are: transfer of money, initiation of a purchase of goods or services, request for information, specification and transmission of information. The information which a CO identifier can specify is very broad. Some examples are: a pointer to the identity of the recipient of funds; special categories from which a recipient can be selected; a time stamp for a purchase; a location at which a purchase was conducted; the identity of a merchant or vendor; an identity of a commodity, goods or services; definition of a purchase order which lists goods and services, a pointer to an index of information, a pointer to information; an affiliation group. CO identifiers can be used with commercial transactions, private transactions and institutional transactions.

A CO identifier can be generally described as a character string. It may have any length although each application may limit the size of the CO identifier for that application. In some applications the size of the CO identifier is dependent on the data supplied by the user. For example, if a person's name is used as part of the CO identifier, the length of the CO identifier can change depending on the length of the name. The identifier may include characters that have the form of a phone number, a social security number, an e-mail address, a person's name, a person's mailing address, or a person's affiliation group. But more generally stated, it may include any phrase whether readable or not, any number, any mixture of letters or numbers, any data codes, or the concatenation of any or all of these in any order or grouping.

A CO identifier could be communicated as a transaction using most types of electronic communications devices which have two way communications capability, including: cell phones, regular telephones, PDAs and computers connected to a network. A CO identifier could be communicated as an advertisement using most forms of electronic devices or paper media which are used for advertising or display. Examples of such electronic devices are: radio, TV, outdoor displays, elevator displays, kiosks, lasers and loud speakers attached to vehicles. Examples of such paper media are: newspapers, magazines, books, flyers, posters, billboards, napkins, banners pulled by aircraft and writing on vehicles.

A CO identifier can be communicated in many forms. Some examples are: tones sent through a communication channel, voice communications sent through a communication channel, digital data, alphanumeric data displayed on a monitor, alphanumeric data printed on any readable surface.

A great benefit of the CO identifier principle is that a financial instrument which uses a CO identifier essentially links the value of the payment conveyed by the instrument to the account of the designated payee. The inherent security of this link creates many opportunities for new services to transport financial instruments which use CO identifiers. Because the financial instrument is resistant to theft, it does not have to be so carefully handled. Presenting a CO identifier payment means the transfer of any money instrument bearing a CO identifier whereby the responsibility for transport or processing of the instrument is also transferred and an individual accounting is made for the instrument. Some examples of presenting with paper checks include: consumer handing the check to a merchant who associates the value of the check with a transaction; merchant passing a bag of checks with CO identifiers to a courier along with a list of the specific checks in the bag; courier handing the bag of checks to a processing service that will sort out the CO identifier checks and take the data off the checks for electronic processing; any party that presents the paper checks to any financial institution for deposit as a value of money to an account. Some examples of presenting with electronic money transfer include: processing service handing a floppy disk with checking data on it that lists CO identifiers and money values associated with them; a processing service that sends data using telecommunication signals which include representations of CO identifiers, either directly readable or encrypted, to another processing service; a processing service that submits money transfer data which uses CO identifiers for routing to a national processing service; a national processing service that communicates money transfer data to any financial institution which uses CO identifiers to deposit as a value of money to an account. An example of presenting using a telecommunications device is the act of an individual pushing the control keys of the device to specify a CO identifier and an amount of money for transfer to any other device connected to the telecommunications system.

Presenting a CO identifier can be related to private transactions, commercial transactions or institutional transactions.

At each stage in the chain of events involved with processing a CO identifier, there is an input, a process and an output. Any entity who takes an action that brings CO identifier data to another party for processing can be considered a presenter of that CO identifier. The presenter may include, for example: a party, a first party, a second party, one party, a purchaser, a consumer, an individual, a purchaser of goods or services, or a payer.

The CO identifier can be presented to, for example: a party, a merchant, to others, a payment processor, a purchase processor, a financial institution, a bank, a consumer, or a payee.

Use of Co Identifiers with Checks

Personal checks still constituted the largest method of consumer payments in the U.S. in the year 2000. An estimated 28.7B consumer checks were written that year, for a total of $2,211B (Federal Reserve Report for cy2000). While check processing has become routine, the process is actually complex, including many steps. A check is, in fact, a formal document which requests that one bank remove money from an account and send it to another account at the same bank or another bank or pay the money as cash.

Benefit of the Use of Co Identifiers with Checks for Payments to Individuals

Figure 9:
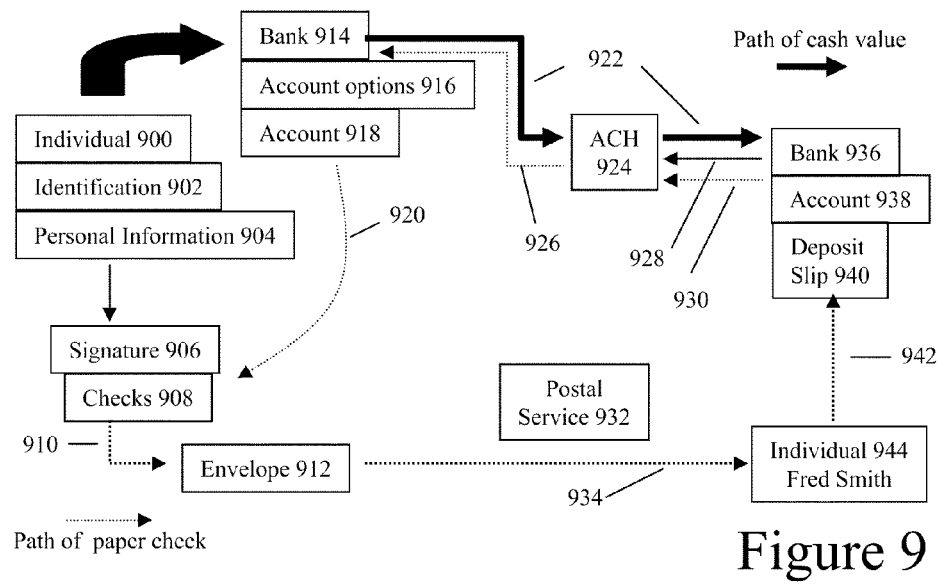
Figure 10:
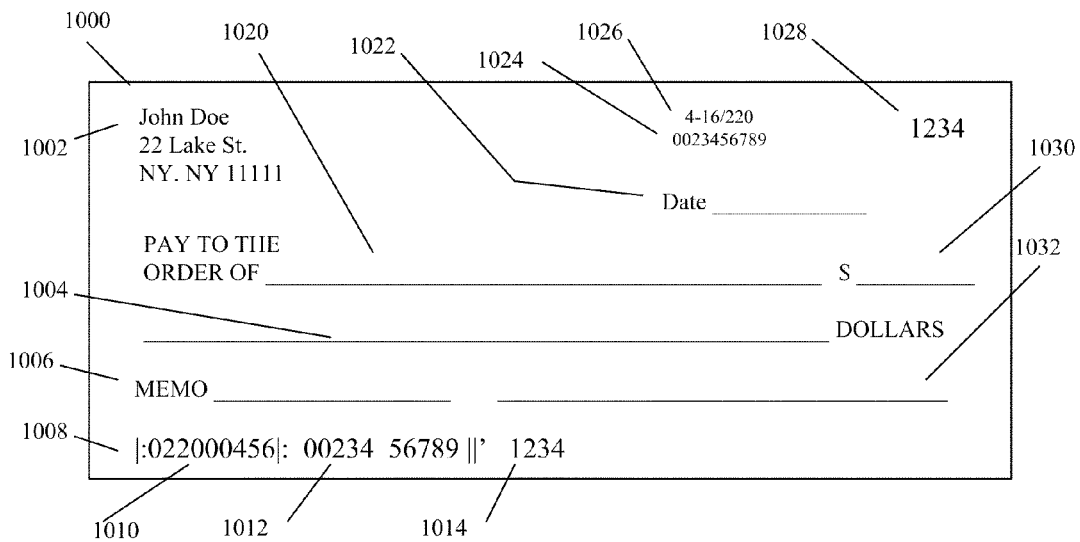
FIG. 10 is a view of a check.

An example detailing the steps which one individual would typically use to send money to a second individual is shown in FIG. 9. To use the checking system, individual 900 opens an account 918 with bank 914 which offers checking as a service. To open the account, the individual supplies the bank with numerous forms of identification 902 including: a photo ID, drivers license and a social security ID card. The individual also supplies the bank with personal information 904 including: name, address, phone number, date of birth, social security number, mother's maiden name, drivers license number, e-mail address and employer identification. If there is a co-applicant, a similar set of information is required for them. The individual must also designate a number of account options 916 which could include: account type, related debit cards, reporting options and check style. The individual must also supply the bank with samples of their signature 906 which can be used as a security method to authorize the withdrawal of funds. Upon approval, the bank will print paper checks 908. Some details which appear on a typical check are shown in FIG. 10. Check 1000 shows the name and address of the account owner 1002, an identifier for the originating bank 1026, the account number that the check can take money out of 1024, a serial number to identify this individual check 1028, a date upon which the check becomes active 1022, a field where the identity of the payee can be entered 1020, the amount to be paid written as a number 1030, the amount to be paid written as words 1004, a field to enter a note about the payment 1006, a field for the issuer to place an authorizing signature 1032, and a second machine readable occurrence of the account identifier 1008, which is composed of a bank identifier 1010, the individual's account number 1012 and the check serial number 1014. Because of the potential checks have for theft, a number of security elements are frequently incorporated into the check printing such as invisible inks, microprinting, water marks, chemically sensitive paper, eraser use indicators and copy resistant colors on the reverse side of the check. The reverse side of the check 1016 is also used in the checking process. When the check is to processed by the person specified in payee field 1020, that person or a designee can enter an identifying signature 1018 called an endorsement, on the reverse side of the check. Checks 908 must be physically transported 920 from bank 914 to individual 900 for use. To use the check, individual 900, who now becomes the sender, must fill in all the applicable fields of the check. In this example, the sender, individual 900 enters the name "Fred Smith" of individual 944 into payee field 1020. This is often considered by a sender to be the completion of the process for them, but it is not so. To complete a payment, many more steps are still needed. The sender must physically transfer the check to the recipient. This can be done in person, hand to hand, but is frequently done using the postal service. The act of delivering the check to the recipient is an integral and necessary part of the process. An envelope 912 must be prepared with the recipient's mailing address, a return address and postage. Check 908 must be placed 910 into envelope 912 and the envelope mailed. The postal service 932 transports 934 the envelope to Fred Smith 944.

When Fred Smith gets the check, he become part of the process. He must, in turn, physically transfer 942 the check to a specific bank 936 with which he has also established an account 938. At bank 936, in order to deposit the check, further identifying information is needed for Fred Smith such as deposit slip 940. At that point, the receiving bank begins an automated process to transfer funds. Bank 936 places a request 928 to transfer money with a check clearing system referred to as the Automated Clearing House (ACH) 924 which transfers value 922 through the ACH system from bank 914 to bank 936. Bank 936 deposits the value received into account 938 based on the information provided by Fred Smith using deposit slip 940. Bank 936 then sends 930 check 908 to the ACH for forwarding 926 back to bank 914 for final verification of signature. If any of these steps are not completed, the transfer can fail. For example, if the check is sent to the wrong address, it must be returned because it does not have sufficient information for processing. If the check somehow gets separated from its envelope, it must also be returned to the sender because of insufficient information to complete the process.

Specifically, the current process of identifying a unique recipient account includes: entering on the check a named recipient in field 1020; identifying a physical address for the recipient with an envelope 912, physically placing 910 the check in the envelope, physically transporting 934 the check to the recipient 944 using a service such as the postal service 932; physically transporting 942 the check to a specific recipient's bank 936 and attaching additional recipient identification to the check using deposit slip 940 which bears the account number for the recipient's personal account 938.

Figure 11:
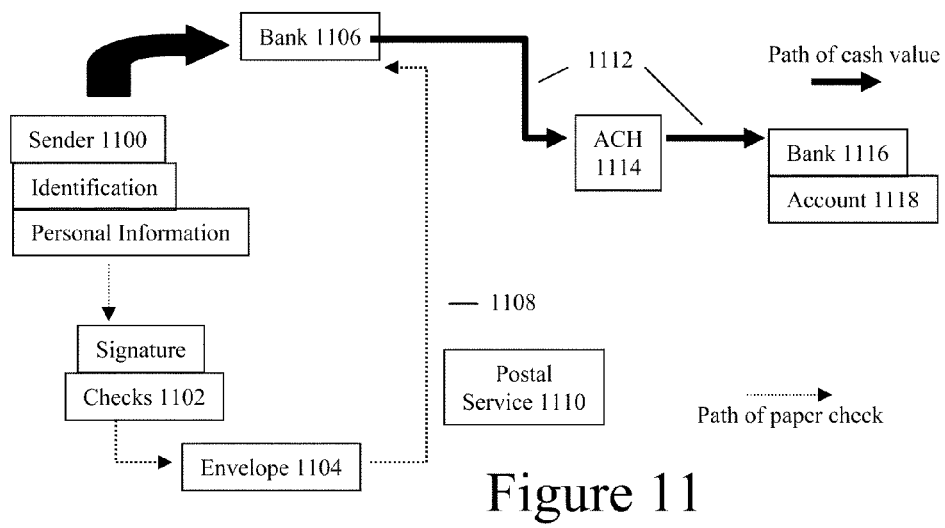

The concept of CO identifiers provides an alternative approach to identify recipient accounts and thereby to process checks that is much more efficient than the current method. A conventional check 1000 shown in FIG. 10 can still be used. Instead of placing the name of a recipient in the payee field 1020, the sender would use a CO identifier that uniquely identifies the recipient. The rest of the check would be filled out in the traditional fashion. As shown in FIG. 11, sender 1100 of check 1102 could then either by hand or postal delivery using an envelope 1104 and postal service 1110, send 1108 the check to the sender's own bank 1106. Bank 1106 could then initiate funds transfer 1112 through ACH 1114 to the recipient's bank 1116 and the recipient's account 1118. Bank 1106 or the ACH system 1114 could translate the CO identifier into a forwarding account by looking up the CO identifier in a lookup table. Unlike current account numbers which must be carefully protected, CO identifiers require no protection. They can therefore be published widely and indexed in multiple computer data bases. Bank 1106 would already have check 1102 at the beginning of the process and could approve it using normal verification procedures, including signature verification.

There are many benefits with this new approach. For the sender, because CO identifier checks would all be sent to the sender's bank, not to each individual recipient, they could be handled together. That is many checks could be mailed in a single envelope. The mailing address is the sender's bank which is conveniently known or would be made convenient using pre-stamped, pre-addressed envelopes. Bulk mailing of checks reduces the cost for the sender. Because the sender may have other reasons to visit his own bank, checks could frequently be dropped off by hand further reducing mailing costs. For the postal system, mail volume would be reduced. For the recipient, there would be no check handling required, no mailing, no deposit slips. For the banking system, there are also many benefits. The funds transfer is more certain because the determination of adequate funds to back the check is done at the beginning of the process. Signature verification could also be done at the beginning. The check information only has to be handled once, by the originating bank, rather than multiple times, which now include the recipient bank and the ACH. No checks have to be physically sorted or transported through the ACH system.

A significant concern in the use of checks is theft. This is the reason so many security provisions, as discussed above, are used with them. One of the mechanisms of theft occurs because the checking system allows checks made payable to a first recipient to be endorsed by that first recipient and handed to a second recipient for cashing or deposit. If a check is stolen, the thief can fraudulently endorse the check and then proceed to cash it as if it were genuinely endorsed. Because endorsement with a true signature cannot easily be verified at the location where the check is cashed, theft of this type is prevalent. Many mechanisms have been put in place to try to stop this form of theft. One preventive measure in use is to write the words "for deposit only" in the area of the check normally used for endorsement. In this case, the check can only be deposited to the account of the designated payee. The use of a CO identifier automatically accomplishes this same protection. That is, if the check is made payable to a CO identifier, no endorsement and redirection is possible. But the CO identifier is more effective because of its redirection capabilities. There is also an advantage that the CO identifier is printed on the same side of the check as all the other accounting data. When the "for deposit only" message method is used, that message must normally be affixed to the rear of the check. In automated methods, this requires double printing or special machinery which is less efficient and therefore more costly.

Benefit of the Use of Co Identifiers with Checks for the Postal System

A major concern for the postal system is mail fraud, and specifically, the theft of checks from the mail. Because financial instruments that use a CO identifier can only transfer money into the account specified by the CO identifier, the financial instrument is not useful to a thief. Stolen checks cannot be endorsed and diverted to cash.

Benefit of the Use of Co Identifiers with Checks for Employers

While direct deposit of payroll is becoming more common, there are still many firms that do not use it. One reason is that direct deposit exposes individual bank accounts to theft because of the requirement for employees to give their bank account numbers to the employer for processing. While this is often done using a check that has been marked "void", the "void" marking only protects against fraudulent use of that one check and not fraudulent use of the account number. By using CO identifiers for each employee, the same efficiency achieved by direct deposit can be achieved without bank account exposure. Using this approach, a small firm could list all payments to be drawn from a particular bank on a single sheet of paper and make one mailing to the bank, effectively creating a "composite" check. The paper would show payment amounts and their related CO identifiers. The CO identifiers would not disclose information that would allow anyone to get access to the money once deposited and therefore would be acceptable to many employees.

Benefit of the Use of Co Identifiers with Checks for Charities

Where a payment is made to a charity by check, a consumer typically prepares some form of document describing that they are making a donation and how much the donation is for. A check is made out in the name of the charity and check stub or ledger information is recorded. The consumer must then find a valid mailing address for the charity. A stamped envelope must be made out with mailing and return addresses. The document and check are then placed in the envelope and physically mailed. At the charity, the envelope must be opened and the information provided physically copied or optically scanned into a data base. The check must be physically transported to the bank where the charity has an account. Using CO identifiers, a consumer could make out the check using a CO identifier for the payee. They could then include that check with others being sent to their own bank for processing. This would reduce the effort required by the consumer. Since an electronic deposit would result to the charity, check handling would be eliminated.

Benefit of the Use of Co Identifiers with Checks for Utilities

Consumers frequently make payments to utilities and banks for services rendered. Examples would be a phone bill and a mortgage payment. The primary method of payment is by check using postal mail. The consumer usually pays the utility in response to a bill for service sent to them. To respond to the bill, the consumer prepares a submittal form usually included with the billing statement describing what service they are paying for and how much the payment is. A check is made out in the name of the utility and check stub or ledger information is recorded. The consumer must copy a valid mailing address for the utility on to a stamped envelope and fill out a return addresses. Some utilities provide special window envelopes to reduce this effort. Return addresses must still be added. The submittal form and check are then placed in the envelope and physically mailed. This process is generally disliked by consumers because it must be repeated a number of times for multiple bills, and repeated for the same bills on a monthly basis. At the utility, the envelope must be opened and the information provided physically copied or optically scanned into a data base. The check must then be physically transported to the utility's bank where the utility has an account for processing. Using CO identifiers, a consumer could make out utility payment checks using a CO identifier for the payee. They could then group checks for multiple utilities and send them in one envelope to their own bank for processing. This would reduce the effort required by the consumer. Since an electronic deposit would result to the utility, check handling would be eliminated. Furthermore, since funds availability would be verified by the consumer's bank at the beginning, there would be many fewer check failures.

Benefit of the Use of Co Identifiers with Checks for Government

There are many government organizations that send money to individuals. Examples of these payments include: social security, veteran benefits, IRS refunds, welfare and Medicare reimbursement. Most of these payments are still made with paper checks. In order to avoid the costs involved with paper checks, some have adopted electronic payment approaches such as direct deposit of social security payments. While efficient, this approach exposes individual bank accounts to theft because of the requirement for individuals to give their bank account numbers to the government agency for processing. Many people also feel the government should not have access to this information. By using CO identifiers for each individual, the same efficiency can be achieved without bank account exposure. To achieve this result, the government agency could simply send a list of CO identifiers with associated payment amounts to a CO identifier processing center via any electronic channel. Because of the security of CO identifiers, encryption or other special forms of protection would not be needed.

There are many government organizations that receive payments by way of checks. Examples of these payments include: taxes and fines. Using CO identifiers, a consumer could make out a payment check using a CO identifier for the government payee: They could then include that check with others being sent to their own bank for processing. This would reduce the effort required by the consumer. Since an electronic deposit would result to the government organization, check handling would be eliminated.

Use of Co Identifiers with Money Orders

Many Americans do not have bank accounts or checking accounts. A money order is a paper payment instrument which is similar to a personal check. It has a number of differences. It can be purchased with cash. The purchaser does not have to have an account with the issuer. The issuer is usually a store or the post office, not a bank. While sharing the handling conveniences of a check, it also has all the risks of a check as well. The primary use of CO identifiers with money orders would occur if the money order was being purchased for a known recipient who had a CO identifier. Then, the money order could be labeled with the CO identifier of the recipient, thereby reducing the possibility of theft. An alternative approach, where the recipient has a CO identifier, could be an "e-money order" whereby upon presenting cash to purchase the e-money order, the equivalent value is sent electronically to the recipient using a CO identifier processing center.

Use of CO Identifiers with Wire Transfers

CO identifiers can create an international financial identification system which makes wire transfers easier and safer. People all over the world could be granted CO identifiers. Because the CO identifiers are inherently safe, wire transfers could be sent using unsecured communications channels. This is easier where computing infrastructure is not sophisticated. This wire transfer process can remain unsecured all the way to the final depository. Alternatively, it could, at any point, reach a processing center which routes the transaction on secured channels as either a CO identifier transaction or a conventional wire transfer.

Use of CO Identifiers with Telephones

Payments using telephones are limited to information forwarding financial instruments such as credit or debit cards where the payment can be transacted using information which is forwarded electronically. Telephones cannot transmit cash or checks because they are physical objects. A new practice is occurring where some banks will allow phone transactions based on direct use of the consumer's bank account number. The following sections will discuss how CO identifiers can be used with telephones to improve financial transfers for each of these methods.

BACKGROUND FOR CREDIT CARDS

In current practice, credit cards are used exclusively to make payments to merchants or businesses. Credit cards are often preferred over debit cards by individuals who don't have sufficient funds to pay for purchases at the time the purchase is made. The property that makes a credit card work is the credit card number and access to a processing center that can initiate a money transfer based on the number. In one use of a credit card, the consumer is physically at a location that has an electronic data device that can read the credit card number from the card as the card is passed through the data device. The process of passing the card through a card reader is called a "swipe". In a second use of a credit card, the consumer reads the credit card number from a card and passes the number as information through some communication process to an agent who can access a processing center. Credit cards provide substantial convenience for consumers and have been widely accepted. But credit card use is vulnerable to security problems. A credit card number provides direct access to a source of funds for which an individual has responsibility. Anyone presenting such a number essentially has access to those funds. The result is substantial exposure for the unsecured use of the numbers.

Credit cards were introduced into commerce in 1950 by Diner's Club as a convenience for restaurant payments in New York. By 1992, the use of credit cards had spread world wide, accounting for almost ⅓ of the value of all consumer payments. But credit card fraud had also become extensive by that time. "In 1992, it was 22 cents on the dollar due to magnetic-stripe counterfeiting. At Visa, (credit card fraud) is as low as it's ever been; 6 cents on the dollar." [John Shaunessy, Visa's senior vice president of risk management, 2000.] The level of credit card fraud has come down sharply, only due to substantial effort. But the high fraud levels caused substantial consumer reluctance to use credit cards. The credit card issuer's responded by supplying insurance against fraud. This insurance generally set the limit of liability for card holders at $50 per fraud incident. In 1996, VISA and MasterCard both made public statements that they would also not collect this limit amount. But consumers have not responded with trust to either the insurance or the offer to waive the limit fees. A study by the National League of Cities found that over 70 percent of Internet users are uncomfortable with providing either credit card or personal information online. A 1999 survey by Jupiter Communications indicates that 64 percent of Internet users are unlikely to trust a Web site even if it has a privacy policy posted. [http://judiciary.senate.gov/privacy.pdf] And while consumers may have individual protection against unauthorized use of their card numbers, the overall cost of credit card fraud shows up in the fees to use the cards.

The use of credit cards for payment over the internet and with wireless communications has opened up new channels for credit card fraud. Meridien Research, of Newton, Mass. stated that fraud losses for payments initiated on the Internet alone topped $1.6 billion in 2000. (Wiscocomputing) Payment information sent over the internet and by wireless transmissions are easy to intercept. Because the information is being transmitted in digital form, it is also subject to automated interception. As more payment data is sent over these channels, the value of interception for fraud purposes will also grow. The response of the credit card industry and internet merchants has been to develop methods to encrypt the credit card numbers during transmission. This method is relatively effective. But it is not equally practical. Encryption is mathematically intensive and logistically complex. It requires special computational elements at both the transmission and reception end of each communication path. These are expensive to install and subject to error and failure. Encryption codes and keys must be used at both ends of the process. The codes are long and complex so they cannot be easily analyzed. The sending and receiving codes must be synchronized so the receiver can decode the data encrypted by the sender. The codes must be changed often because they can be figured out over time. The code handling must be hidden from the consumer because it is very complex.

The CO identifier principle can be used to improve the credit card system by reducing the chance of theft of the credit card number using a new payment model.

BACKGROUND FOR DEBIT CARDS

In the U.S. for 2000, there were approximately 3 billion PIN-based debit transactions with a total value of $138.2 billion and 5.3 billion signature-based debit transactions with a total value of approximately $210 billion for a debit card total of $348B. [Federal Reserve report for 2000]

Debit cards are issued by individual banks and allow direct withdrawals from individuals bank accounts. The top Debit Card Issuers include: Bank of America, Citicorp, Banc One, First Union, Chase Manhattan, Norwest Bank, U.S. Bancorp, First Tennessee Bank and Merrill Lynch Cash Management. [applicationsforcreditcards.com]

The primary advantage for the use of debits cards over credit cards is low cost. The disadvantage is that funds must be available on deposit for use.

Benefit of the Use of Co Identifiers with Telephones for Individuals

Consumers frequently make cash payments to other individuals for goods traded or services rendered in face to face interactions. After rendering a service or presenting goods for inspection, a buyer can present cash to a seller as payment. The process is relatively simple, but there are situations that create problems. If the amount of money involved is large, cash is not convenient for a number of reasons. For example, assume two people are exchanging a used automobile for $1000. This is more cash than most individuals normally carry, so a buyer would have to go to a bank and make a withdrawal. They could not use an ATM transaction at the present time because this amount exceeds ATM withdrawal limits. Because cash is directly negotiable, the $1000 is subject to theft or loss. Another problem occurs if the denominations of cash held by the buyer do not precisely match the transaction amount. For example, assume two people are exchanging a tool and agree to a price of $60, but the buyer only has a $100 bill. The seller would have to have the correct change to complete the transaction. The primary alternative in society today is the paper check.

After rendering a service or presenting goods for inspection, a buyer can present a check to a seller as payment. Using a check provides benefits over paying with cash. But the check process is more cumbersome and has risks of its own. The process is more cumbersome for the buyer because the preparation of a check requires more steps than payment by cash. The name of the seller must be entered, the date the funds are authorized for release is needed. The amount must be entered in two forms and these items must be transcribed onto the check stub or ledger. The check must be authorized with a signature. The process is more cumbersome for the seller as well because payment by check is inherently risky. The check presented may have been stolen. To mitigate against this, a seller will ordinarily request separate identification information from the buyer and match it to details on the check. If there is no address on the check or the address does not match the separate identification, this method is not effective. If the checkbook was stolen along with a wallet, this method is not effective. Even if the buyer is an authorized user of the check, and the separate identification information matches, the check may not represent sufficient availability of funds. The buyer may not have sufficient funds in their checking account to cover the amount presented. To mitigate this, sellers often require special bank or certified checks which guarantee funds. This creates a substantial additional burden on the buyer to obtain such a check.

CO identifiers can be used with cell phones, telephones or other electronic devices, to complete face to face transactions with increased security. The buyer could call a CO identifier service center on their cell phone. The seller would tell the buyer their personal CO identifier. In response to a voice prompt, the buyer could enter the CO identifier presented to them by pressing numbers on the phone. The processing center could identify the buyer's cell phone using caller ID or the cell phone registration number. The buyer could then be requested, using a voice prompt, to enter the payment amount. Because the current example involves a direct transfer of goods, it creates a need to verify that the person using the phone is authorized to use that specific phone for purchases, very much like the verification needed for credit cards and checks. This situation occurs because the person using the phone can immediately, physically take the items presented with them. If the phone is stolen or being used without authorization, the person using the phone can take the items, while payment for the items is charged to the person to whom use of the phone is authorized. For this type of "cash and carry" process, a satisfactory user verification process would be used, which is not claimed as part of this patent. For purposes of making this example complete, however, such a process might include the entry of a PIN number. Upon receipt of the payment amount and PIN number, the processing center could verify sufficient funds for the payment. In order to assure the seller that the buyer has actually conducted a transaction, the center could then call the seller's phone and verify to the seller the payment amount, that sufficient funds are available for payment and that an authorization has been done by the buyer and the transaction accepted.

In summary, to show that from the consumer's viewpoint, this process is relatively simple, the steps from the buyer's viewpoint are: call the processing center, enter the CO identifier, enter the payment amount, provide a PIN number, accept the transaction. From the seller's viewpoint, the steps are: agree to a price, provide a CO identifier, accept a call confirming the transaction amount and authorization.

Concerning fraud, the elements of concern are: exposure of personal information for either the buyer or seller; theft of the buyer's phone; buyer conducting a fraudulent transaction. The CO identifier process is secure because it mitigates these elements. First, no financial or personal identification information is transmitted over unsecured channels. The seller uses only a CO identifier. The buyer is identified by caller ID. Theft of the phone is prevented using a PIN number or other known methods to insure the person using the phone is the authorized user. A fraudulent transaction is prevented by verification to the seller over a second channel, such as the event where a buyer pretends to conduct a transaction but either doesn't do so or a fraudulent transaction is made, such as a smaller value transacted than agreed.

Remote individual to individual payments—Consumers frequently make payments to other individuals for goods traded or services rendered even though the parties are not face to face. In some cases, the parties have never met. Goods or a report on services are usually shipped from seller to buyer. Payment is usually sent from buyer to seller in the form of a check. The consumer prepares some form of document describing that they are making a payment for something and how much the payment is for. A check is made out in the name of the individual and check stub or ledger information is recorded. The buyer must obtain a valid mailing address for the seller. A stamped envelope must be made out with mailing and return addresses. The document and check are then placed in the envelope and physically mailed. When the envelope reaches the seller, the envelope must be opened and the information provided verified. The check must then be physically transported to a bank where the seller has an account.

A much simpler process is required using CO identifiers. The buyer must obtain a valid CO identifier from the seller. To make a payment, the consumer could call a CO identifier processing center with their cell or regular phone. The processing center could identify the phone using caller ID and then request a transaction number. The consumer would then enter the CO identifier for the individual they wish to pay. The processing center could then confirm the name of the individual and request the amount that the buyer wishes to pay. The consumer would then enter the amount using the touch tone keys. The processing center could then confirm the amount. If the consumer was satisfied with the amount stated, they could authorize the payment by pressing a number associated with "yes".

In this case, there is no need for the consumer to find addressing information, to make out checks or envelopes or to supply identification or payment data because that information is already known to the processing center. There is no risk in transmitting the CO identifier because it cannot be used to take money out of the selling individuals account. The processing center would then, automatically, initiate a money transfer from the account of the buyer to the account of the seller.

While the previous example discusses an individual to individual payment as if it were a sales transaction, the process would apply equally well to payments between family members, relatives or friends where no commercial element is involved.

Figure 12:
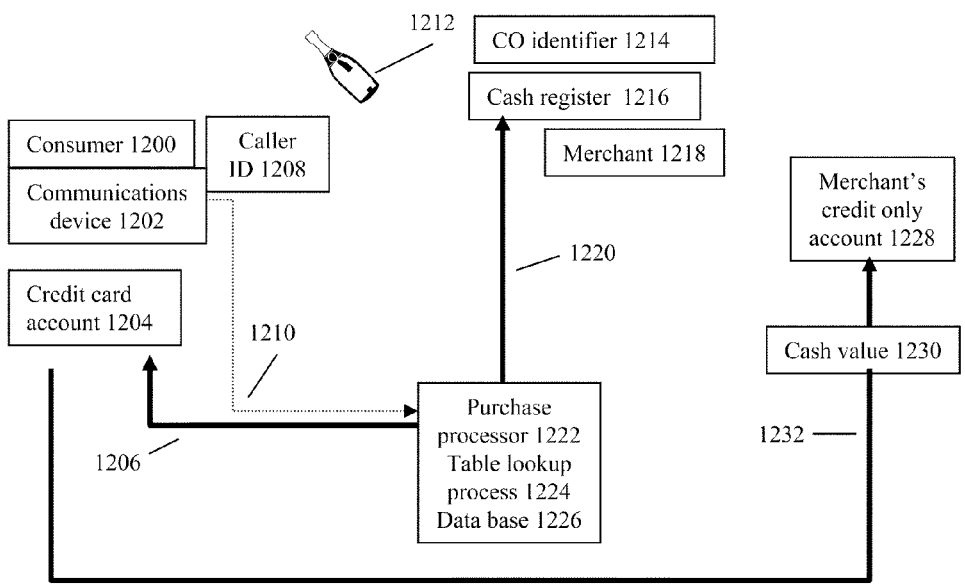

Use of Co Identifiers with Telephones for Merchants for Cash and Carry Purchases An example of the use of CO identifiers in place of credit cards, where a purchase is done in a store, is shown in FIG. 12. In this example, consumer 1200 is in the store of merchant 1218 and wishes to purchase an item 1212. In preparation for the purchase, the consumer has carried the item to a checkout cash register 1216. A clerk at cash register 1216 rings up the sale in the regular fashion, showing the consumer the total price. The consumer then tells the clerk that he wishes to pay for the item using a CO identifier. To initiate the process, the consumer 1200 establishes a communications channel 1210 with purchase processor 1222 using communications device 1202. The communications device could be a cell phone, for example. In this case, the payment transaction is not conducted directly with the merchant, but through a third party agent, shown here as purchase processor 1222. The purchase processor identifies communications device 1202 using caller ID 1208. Based on the calling device identity, the purchase processor performs a table lookup process 1224 using data base 1226 to determine credit card account 1204 which is associated with the communications device. The purchase processor would then request a CO identifier from the consumer. Consumer 1200 would send numerical CO identifier 1214 as touch tone numbers using device 1202. This CO identifier could be publicly displayed somewhere near the cash register. CO identifier 1214 would provide sufficient information to identify the merchant 1218, the cash register 1216 and the merchant's credit only bank account 1228. The purchase processor 1222, upon receiving CO identifier 1214 from consumer 1200 would then take on the role of a payment processor. Based on the technology in place, the purchase processor would then either automatically access cash register 1216 using secured communications channel 1220 to determine the total payment due or request that consumer 1200 numerically key in the price using device 1202. After obtaining the total transaction price, purchase processor 1222 would check credit card account 1204 for access authorization and sufficient funds using secured communications channel 1206. In some cases, consumer 1200 might be asked to enter a user identification number such as a personal identification number (PIN) on communications device 1202. If funds and access were adequate, purchase processor 1222 would send a transaction authorization to cash register 1216 and a transaction complete message to consumer 1200 using communications device 1202. The purchase processor would then instruct credit card account 1204 over secured communications channel 1206 to pay the merchant's credit only account 1228. The credit card bank would then transfer cash value 1230 from account 1206 to the merchant's credit only account 1228 over secured electronic channel 1232.

For this example shown in FIG. 12, no credit card number is transmitted over communications channel 1210, which is the only unsecured channel in the process. This is usually the public communications system. The credit card number thereby stays protected. In the case where a PIN number is sent over channel 1210, the process is exposed to risk because the PIN number is exposed to theft. Other user identification methods, which are immune to fraudulent interception, would improve the process.

Use of Co Identifiers with Telephones for Merchants for Catalog Purchases

Figure 13:
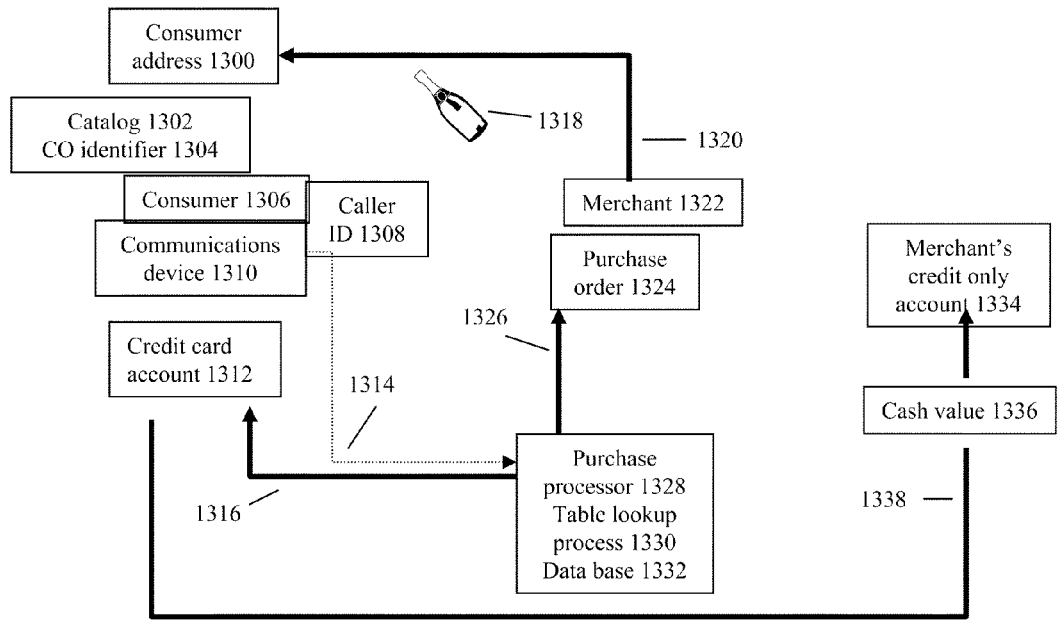

Another example of the use of CO identifiers in place of credit cards for a remote purchase using a catalog is shown in FIG. 13. In this example, consumer 1306 is at his home and wishes to purchase an item 1318 which the consumer sees in a catalog. To initiate the process, the consumer 1306 establishes a communications channel 1314 with a purchase processor 1328 using communications device 1310. The communications device could be a conventional telephone, for example. Using CO identifier methods discussed elsewhere in this document, the payment transaction is not conducted directly with the merchant, but through a third party agent, shown here as purchase processor 1328. The purchase processor identifies communications device 1310 using caller ID 1308. Based on the calling device identity, the purchase processor performs a table lookup process 1330 using data base 1332 to determine credit card account 1312 which is associated with the communications device. The purchase processor would then request a CO identifier from the consumer. Consumer 1306 would send numerical CO identifier 1304 as touch tone numbers using device 1310. This CO identifier would be found in catalog 1302. CO identifier 1304 would provide sufficient information to identify the merchant 1322, the merchant's credit only account 1334 and either item 1318 or catalog 1302. The purchase processor 1328, upon receiving CO identifier 1304 from consumer 1306 would then take on the role of a purchasing agent. After communicating with the consumer to determine the quantity of the particular item desired and any additional items desired, the purchase processor computes the total amount due. The purchase processor verifies that credit card account 1312 is authorized and has sufficient funds. If funds and access were adequate, authorization to complete the order would be requested from the consumer. Upon authorization, purchase processor 1328 places an order for goods with merchant 1322 over communications channel 1326. The purchase could be made using a purchase order 1324. Merchant 1322 ships item 1318 to an address 1300 specified by the purchase processor as shown by arrow 1320. The purchase processor also instructs credit card account 1312 using channel 1316 to pay the merchant's credit only bank account 1334. Credit card account 1312 transfers cash value 1336 to the merchant's credit only bank account 1334 over an electronic channel 1338.

For this example shown in FIG. 13, no credit card number is transmitted over communications channel 1314, which is the only unsecured channel in the process. This is usually the public communications system. The credit card number thereby stays protected.

CO identifiers have the ability to reduce credit card fraud. In the previous example using FIG. 12, channel 1210 over which wireless cell phone data was transmitted and all verbal communication between consumer 1200 and a clerk at cash register 1216, which was essentially a public discussion, would be considered unsecured communications. In the example using FIG. 13, channel 1314 over which regular telephone phone data was transmitted, would be considered unsecured communications. These are typical weak points for credit card theft. Using CO identifiers, no credit card information is transmitted over these channels. The information that is transmitted is protected by the CO identifier principle. Furthermore, the credit card account is ultimately charged so the consumer retains an ability to buy on credit and defer payments.

Use of CO Identifiers with Telephones for Merchants for Newspaper and Magazine Ad Purchases Another payment process that is now used infrequently by consumers is to make a purchase based on an ad in a newspaper or magazine. In such a process, the consumer possesses a newspaper or magazine showing one or more items for sale. Unlike a catalog, there are usually very few items offered. To complete this purchase, the ad usually offers a specific phone number that can be called. To initiate the purchase, the consumer calls the specified phone number, describes the media in which they saw the ad and the items desired. Payment and shipping information is also provided. In this case, the consumer does not take physical possession of the item purchased at the time of purchase. The merchant receiving the information processes the payment information and sends the items requested. Payment is usually made using a credit or debit card. This process is infrequently used because of the large amount of data that must be transferred and the perceived risk in sending that data through an insecure communication channel.

A much simpler process is required using CO identifiers. The consumer would select one or more desired items from an ad as before. To order the items, the consumer could call a CO identifier processing center with their cell or regular phone. The processing center could identify the phone using caller ID and then request a transaction number. The ad would display a special CO identifier, which would be specific for that ad which the consumer would enter. The consumer would then enter product identifiers and quantities for all of the items they wish to order. The processing center could then confirm these items and calculate the total due including tax based on pre-known purchase location determined from the consumer identity data associated with the caller ID. If the consumer was satisfied with the total cost and itemization, they would authorize the purchase by pressing a number associated with "yes".

In this case, there is no need for verification of caller identity because the items ordered will be shipped to a location authorized ahead of time for the specific phone. This is discussed further in the section that discusses inherent security based on shipping to an authorized location. There is no need for the consumer to supply payment data because that data is already known to the processing center. There is no risk in disclosing the CO identifier shown in the ad because this identifier cannot be used to transfer money out of a merchant's account.

Use of Co Identifiers with Telephones for Merchants for Tv and Radio Ad Purchases Another payment process that is used by consumers, infrequently, is to make a purchase based on an ad seen on TV or heard on the radio. In such a process, the consumer sees or hears an ad showing or describing one or more items for sale. With this type of ad, there is usually only a single item offered at any one time. To complete this purchase, the ad usually offers a specific phone number that can be called. To initiate the purchase, the consumer calls the specified phone number, describes the media in which they saw the ad and the item desired. Payment and shipping information is also provided. In this case, the consumer does not take physical possession of the item purchased at the time of purchase. The merchant receiving the information processes the payment information and sends the items requested. Payment is usually made using a credit or debit card. This process is infrequently used because of the large amount of data that must be transferred and the perceived risk in sending that data through an insecure communication channel. A much simpler process is required using CO identifiers. Instead of specifying a phone number to call, the ad would specify a CO identifier. To order the items, the consumer could call a CO identifier processing center with their cell or regular phone. The processing center could identify the phone using caller ID and then request a transaction number. The consumer would then enter the CO identifier for the item advertised. The processing center could then request the quantity of items desired. It would then confirm these items and calculate the total due including tax based on pre-known purchase location determined from the consumer identity data associated with the caller ID. If the consumer was satisfied with the total cost and itemization, they would authorize the purchase by pressing a number associated with "yes".

In this case, there is no need for verification of caller identity because the items ordered will be shipped to a location authorized ahead of time for the specific phone. This is discussed further in the section that discusses inherent security based on shipping to an authorized location. There is no need for the consumer to supply payment data because that data is already known to the processing center. There is no risk in disclosing the CO identifier shown in the ad because this identifier cannot be used to transfer money out of a merchant's account.

Use of Co Identifiers with Telephones for Merchants for Poster, Billboard and Outdoor Display Ad Purchases Another payment process that is used by consumers, infrequently, is to make a purchase based on an ad seen on a poster, billboard or other form of outside advertising. Some additional outside advertising forms are aircraft, balloons, signs on busses, cabs, trucks and trains. In such a process, the consumer sees an ad showing one or more items for sale. With this type of ad, there is usually only one or a few items offered at any one time. To complete this purchase, the ad usually offers a specific phone number that can be called. To initiate the purchase, the consumer calls the specified phone number, describes the form in which they saw the ad and the item desired. Payment and shipping information must be provided by the consumer. In this case, the consumer does not take physical possession of the item purchased at the time of purchase. The merchant receiving the information processes the payment information and sends the items requested. Payment is usually made using a credit or debit card. This process is infrequently used because of the large amount of data that must be transferred and the perceived risk in sending that data through an insecure communication channel.

A much simpler process is required using CO identifiers. Instead of specifying a phone number to call, the ad would specify a CO identifier. To order the items, the consumer could call a CO identifier processing center with their cell or regular phone. The processing center could identify the phone using caller ID and then request a transaction number. The consumer would then enter the CO identifier for the item advertised. The processing center could then request the quantity of items desired. It would then confirm these items and calculate the total due including tax based on pre-known purchase location determined from the consumer identity data associated with the caller ID. If the consumer was satisfied with the total cost and itemization, they would authorize the purchase by pressing a number associated with "yes".

In this case, there is no need for verification of caller identity because the items ordered will be shipped to a location authorized ahead of time for the specific phone. This is discussed further in the section that discusses inherent security based on shipping to an authorized location. There is no need for the consumer to supply payment data because that data is already known to the processing center. There is no risk in disclosing the CO identifier shown in the ad because this identifier cannot be used to transfer money out of a merchant's account.

Benefit of the Use of Co Identifiers with Telephones for Charities

In the case where a donation is to be made by credit or debit card using a phone, the consumer must find a phone number that accepts donations for the charity. They call the phone number and then verbally communicate their personal information and all the payment information related to the card. At the charity, a human must write down or directly type into a data base program, all the information provided. The charity must then initiate a credit card transaction.

A much simpler process is required using CO identifiers. Ideally, all the major charities would sign up for CO identifiers. These could be listed in phone books because the CO identifiers are inherently safe. A number of methods would be available for consumers to find the appropriate CO identifier. If the donation is being made in response to a media ad, the CO identifier would be stated in the ad. For example, an ad for the Red Cross might state, "to make a donation to the Red Cross, use CO identifier 22. To make a donation, the consumer could call a CO identifier processing center with their cell or regular phone. The processing center could identify the phone using caller ID and then request a transaction number. The consumer would then enter the CO identifier for the charity they wish to make a donation to. The processing center could then confirm the name of the charity and request the amount that the consumer wishes to donate. The consumer would then enter the amount using the touch tone keys. The processing center could then confirm the amount. If the consumer was satisfied with the amount stated, they could authorize the purchase by pressing a number associated with "yes".

In this case, there is no need for the consumer to find addressing information, to make out checks or envelopes or to supply identification or payment data because that information is already known to the processing center. There is no risk in transmitting the CO identifier because it cannot be used to take money out of the charity's account. The processing center would then, automatically, initiate a money transfer from the account of the consumer to the account of the charity and send record keeping data to the charity.

Benefit of the Use of Co Identifiers with Telephones for Utilities

Consumers do not usually now pay utility bills over the phone. A new simple approach is possible using CO identifiers. Ideally, each utility and bank would have been issued a CO identifier. They could include a CO identifier on their billing information. For example, a bill for the phone company might state, "please use CO identifier 411 for payment". To pay a bill, the consumer could call a CO identifier processing center with their cell or regular phone. The processing center could identify the phone using caller ID and then request a transaction number. The consumer could then enter the CO identifier for the utility they wish to pay. The processing center could then confirm the name of the utility and request the amount that the consumer wishes to pay. The consumer could then enter the amount using the touch tone keys. The processing center could then confirm the amount. If the consumer was satisfied with the amount stated, they could authorize the purchase by pressing a number associated with "yes".

In this case, there is no need for the consumer to find addressing information or to make out checks or envelopes. To pay multiple bills, the consumer could make a single call to the processing center and enter multiple CO identifiers with payment amounts. A monthly process that could take half an hour or more, not including the cost and effort of mailing could be reduced to a few minutes.

There is benefit at the utility and bank side as well. The entire manual process of envelope handling, data copying and check handling is eliminated. There is no risk in transmitting the CO identifier either, which points to a utility or banking service bank account, because it cannot be used to take money out of the utility's account.

Benefit of the Use of Co Identifiers with Telephones for Government

Consumers do not usually now pay government bills using the telephone. A new simple approach is possible using CO identifiers. Ideally, each government organization would have been issued a CO identifier. The government organization could include a CO identifier on their billing information. For example, a bill for a particular city might include the statement, "please use CO identifier 02443 for payment". To pay a bill, the consumer could call a CO identifier processing center with their cell or regular phone. The processing center could identify the phone using caller ID and then request a transaction number. The consumer could then enter the CO identifier for the government organization they wish to pay. The processing center could then confirm the name of the government organization and request the amount that the consumer wishes to pay. The consumer could then enter the amount using the touch tone keys. The processing center could then confirm the amount. If the consumer was satisfied with the amount stated, they could authorize the purchase by pressing a number associated with "yes".

In this case, there is no need for the consumer to find addressing information or to make out checks or envelopes. To pay multiple bills, the consumer could make a single call to the processing center and enter multiple CO identifiers with payment amounts.

There is benefit at the government organization side as well. The entire manual process of envelope handling, data copying and check handling is eliminated. There is no risk in transmitting the CO identifier either, which points to a government organization bank account, because it cannot be used to take money out of the government organization's account.

In summary, for payment processing using telephone systems, the CO identifier method includes the ability of party A (such as a consumer) to make payments to party B (for example a merchant or another individual), through communication with a third party C (such as a bank) where party C can be a general service provider. The exact access information for the account of party B can be divulged in the same communication as the payment data, even if the transmission is subject to easy monitoring (like cell phone radio transmissions) or wire taps, or the conversation is being held in an insecure location where others may listen in. The identifiers for CO accounts of all types may be published freely, so that third party service providers can help consumers find them and use them. As long as party B is identified only with a CO identifier, the third party service provider does not have to be a "trusted third party" with respect to the account information of the recipient.

Use of CO Identifiers with the Internet

Payments using the internet and personal digital assistants (PDAs) are limited to information forwarding financial instruments such as checks, credit or debit cards where the payment process can be completed using information transfer. The internet cannot use cash because it is a physical object. A substantially simplified internet payment process in current practice for a check, credit or debit card user could generally involve the following steps: the user establishes access to the internet; a web page address for a particular merchant is entered into a web browser; a web page for the specified address is received which has information about items to be purchased; an item is selected using point and click where the click process places the information for that item into a "shopping cart"; the user clicks an on-screen button to jump to a checkout process; payment data including a check, credit or debit card number is entered; an on-screen button is clicked to authorize and finalize the process. To use this process, the internet user must be connected to a merchant or specialized intermediary who can process the check, credit or debit card financial information.

Background for the Internet

The web based payment process produces a number of very subtle relationships. The use of web addresses or universal resource locators (URLs) establishes an information link between the user and merchant. The web page received by the user is a visual confirmation of the correctness of the URL. Concerning the payment process, the communication link creates a virtual identifier for the merchant so that information sent to that merchant does not have to be tagged with a merchant identifier. Specifically, for the transfer of payment to the merchant, the virtual link allows the merchant to keep financial information that identifies the merchant's bank accounts secret. This is not the case for the user. To make a payment, the user must disclose sensitive account access information, i.e. a bank check, credit card or debit card number. With credit card or debit card numbers, this includes expiration date or PIN. Because the web is not a secure channel, this information is subject to theft. Meridien Research, of Newton, Mass. states that fraud losses for payments initiated on the Internet topped $1.6 billion in 2000. More than $700 million in online sales were lost to fraud in 2001, representing 1.14 percent of total annual online sales of $61.8 billion, according to GartnerG2. A study by the National League of Cities found that over 70 percent of Internet users are uncomfortable with providing either credit card or personal information online [http://judiciary.senate.gov/privacy.pdf].

Benefit of the Use of Co Identifiers with Credit Cards and the Internet

Figure 14:
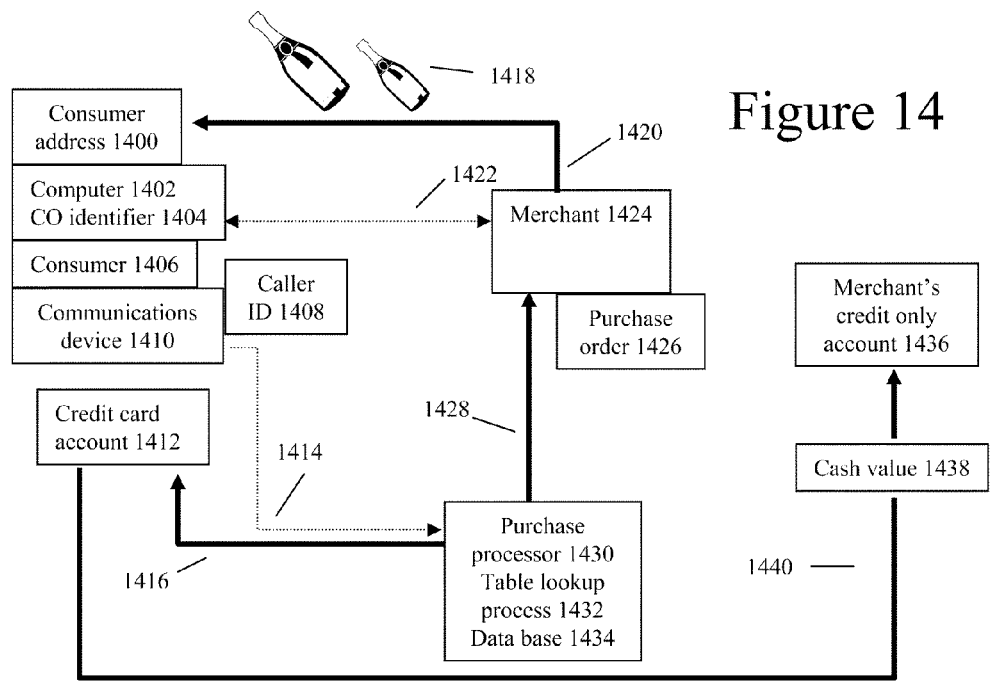

The use of CO identifiers in place of credit cards, for a purchase using information from the Internet, is shown in FIG. 14. In this example, consumer 1406 is at his home and wishes to purchase a variety of items 1418 which the consumer sees on a web page while using computer 1402, which is connected to the Internet. Computer 1402 has established Internet link 1422 to merchant 1424. Using typical "shopping cart" capabilities, the consumer could select the items to be purchased. The web site could compute the total due and then ask for payment. The web site could offer the option of paying using a CO identifier. To pay using a CO identifier process, the consumer 1406 establishes a second communications channel 1414 to a purchase processor 1430 using a second communications device 1410. The communications device could be a conventional telephone, for example. Using CO identifier methods discussed elsewhere in this document, the payment transaction is not conducted directly with the merchant, but through a third party agent, shown here as purchase processor 1430. The purchase processor identifies communications device 1410 using caller ID 1408. Based on the calling device identity, the purchase processor performs a table lookup process 1432 using data base 1434 to determine credit card account 1412 which is associated with the communications device. The purchase processor would then request a CO identifier from the consumer. Consumer 1406 would send numerical CO identifier 1404 as touch tone numbers using device 1410. This CO identifier would be found on the payment web page of merchant 1424 which is displayed on computer 1402. CO identifier 1404 would provide sufficient information to identify the merchant 1424, the merchant's credit only account 1436 and the specific web page being presented to the consumer. The purchase processor 1430, upon receiving CO identifier 1404 from consumer 1406 would then take on the role of a purchasing agent. The purchase processor would communicate with merchant 1424 using secure channel 1428 to obtain the total cost of the proposed transaction. The purchase processor could then verify that credit card account 1412 is authorized and has sufficient funds. If funds and access were adequate, authorization to complete the order could be requested from the consumer. Upon authorization, purchase processor 1430 places an order for goods with merchant 1424 over communications channel 1428. The purchase is made as a purchase order 1426. Merchant 1424 ships items 1418 to an address 1400 specified by the purchase processor as shown by arrow 1420. The purchase processor also instructs credit card account 1412 using secure channel 1416 to pay the merchant's credit only bank account 1436. Credit card account 1412 transfers cash value 1438 to the merchant's credit only bank account 1436 over a secure electronic channel 1440.

For this example shown in FIG. 14, no credit card number is transmitted over communications channel 1414 or Internet connection 1422, which are both unsecured channels. The credit card number thereby stays protected. A question may be raised concerning the added effort needed to establish a second communication channel. For cases where an Internet purchase involves a new merchant, there is substantial effort required to provide all the information needed to complete payment. In this case, the effort of using the phone as a second channel is less than direct use of the Internet because a CO identifier processing center would already have all the contact information. For the case where a consumer already has established a payment account with a web merchant, the effort needed to establish and interact with a second channel may be greater than the effort needed to complete the purchase over the Internet, in which case the consumer would need to choose between convenience and security.

Figure 15:
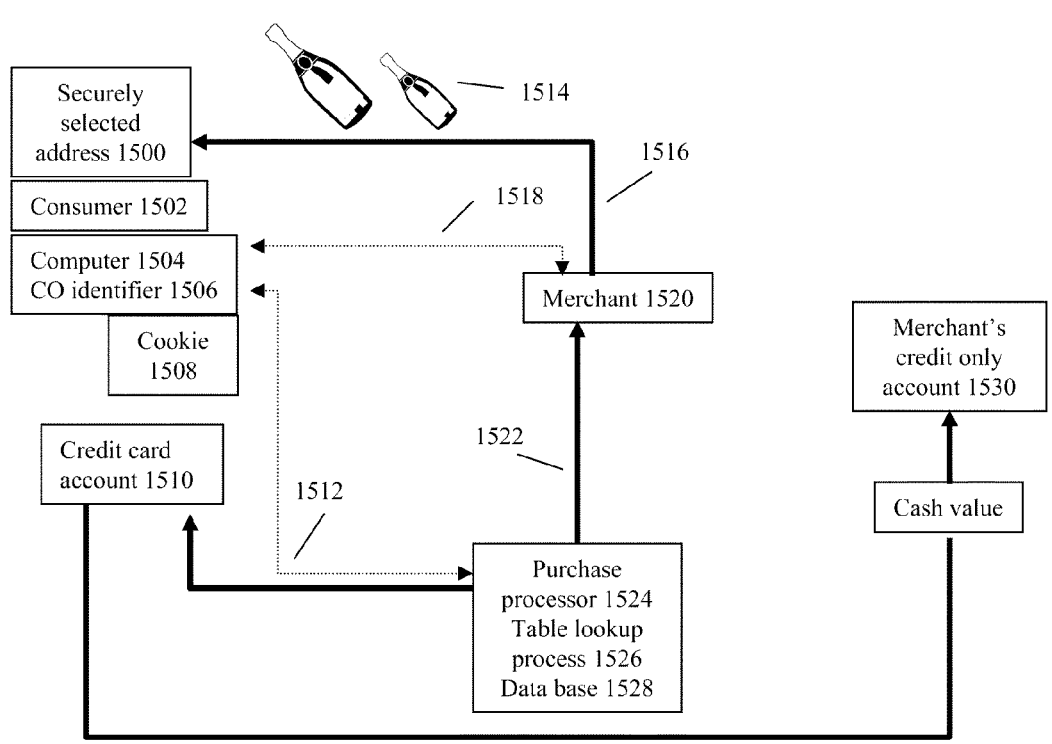

In the example using FIG. 14, channels 1414 and 1422 over which regular telephone phone data and Internet data were transmitted, would be considered unsecured communications. CO identifiers can be used entirely on the Internet without the need for a separate telephone channel. This is shown in FIG. 15. In this example, consumer 1502 is at his home and wishes to purchase a variety of items 1514 which the consumer sees on a web page while using computer 1504, which is connected to the Internet for delivery 1516 to a securely selected address 1500. Computer 1504 has established Internet link 1518 to merchant 1520. Using typical "shopping cart" capabilities, the consumer could select the items to be purchased. The web site could compute the total due and then ask for payment. The web site could offer the option of paying using a CO identifier. To pay using a CO identifier process, consumer 1502 establishes a second Internet channel 1512 to a purchase processor 1524 with a web site. Using CO identifier methods discussed elsewhere in this document, the payment transaction is not conducted directly with the merchant, but through a third party agent, shown here as purchase processor 1524, who is accessed in a separate browser window from that of the merchant. The purchase processor identifies computer 1504 using a cookie 1508 which the purchase processor has placed on the consumer's computer during a previous session. Based on this identity, the purchase processor performs a table lookup process 1526 using data base 1528 to determine credit card account 1510 which is associated with the communications device. The purchase processor would then request a CO identifier from the consumer. Consumer 1502 could then send a fully alphanumeric CO identifier 1506 which could have been copied from the payment web page of merchant 1520 which is displayed on computer 1504. CO identifier 1506 would provide sufficient information to identify the merchant 1520, the merchant's credit only account 1530 and the specific web page being presented to the consumer. The purchase processor 1524, upon receiving CO identifier 1506 from consumer 1502 would then take on the role of a purchasing agent. The purchase processor would communicate with merchant 1520 using secure channel 1522 to obtain the total cost of the proposed transaction. The remainder of this transaction is identical to the web based transaction with a telephone system discussed above.

This process is desirable in some cases because a second form of communications channel is not required. Some consumers, who do not have a cell phone, for example, use their telephone line with a modem for their web connection. They could interact with two web sites simultaneously over the single phone line, but do not have a second phone line available. The process is secure because no credit card number is transmitted over Internet channels 1518 or 1512, which are both unsecured channels. The credit card number thereby stays protected. The fully web based process is less secure than a the process of FIG. 14 where a phone is used as a second channel because the cookie process used for identification of the computer is less secure than caller ID. However, for most purchases that are made with the Internet, the association of payment account with a secured delivery address principle provides adequate security. Security is not provided with this principle for delivery of data over the web, which might be considered "cash and carry" transactions.

Use of Context Sensitive, Concatenated Identifiers and Apparent Identifiers with Paper Financial Instruments The concept of CO identifiers allows new processing methods for paper financial instruments, such as checks and money orders, that are much more efficient than current methods. The new paper based processing methods were discussed at length in the sections titled: Use of CO Identifiers with Checks and the Automated Clearing House system and Use of CO Identifiers with Money Orders. As part of these new processes, instead of putting the name of a recipient in the "pay to" field on the check as is currently done, which is insufficiently precise to uniquely identify a specific individual on a national or worldwide scale, a CO identifier that is sufficient to uniquely identify the recipient would be entered. In order to identify the entire population of consumers and merchants who might want to use the CO identification system, the CO identifier needs to have sufficient resolution to include at least one unique construction for each identified user. If a number were used, it would be long like the current bank routing number. While such a number could be made safe against theft using CO identifier methods, it would still be impractical for people to remember and use.

Because checks and money orders are made out manually or with computer driven printers, the fields of the check can be filled with both numeric and alphanumeric entries. The use of alphanumeric CO identifiers is a feature that can be used with paper instruments to greatly improve their usability.

While making identifiers short has been stated as a goal to produce convenience, with alphanumeric identifiers, this goal is generally forgone in favor of psychosocial factors which produce better usability.

One method for creating such an identifier is the use of the CONTEXT of LOCATION. For example, using CO identifiers to send payments from one individual to another, it would be desirable for a consumer, in sending a check to a specific "Fred Smith", to simply write Fred Smith in the "pay to" section of a check. But this would not be a sufficiently unique identifier because there are many Fred Smiths in the world.

But assume that the specific Fred Smith in question was born in the town of Acadia Me., and that there was only one Fred Smith who was born there and, for the purposes of CO identifiers, Acadia has been granted a special prefix "Acadia". Then a check made out to, "Acadia, Fred Smith" could uniquely identify one specific Fred Smith. This identifier is easy to remember and easy to write out because it is composed of simple, familiar parts. Identifiers of location could include, without limitation: towns, cities, street names, states, regions, national parks, rivers, mountains. Principles used to select location context could include, without limitation: birth place, long period of residence, special schooling such as college, a special work location, place of marriage, place of retirement, favorite vacation spot etc. The statement in this example that Fred Smith was the only person born in Acadia is not critical, as multiple Fred Smiths could be separately identified as Fred Smith 1, Fred Smith 2, Fred A. Smith, tall Fred Smith etc. Each complete identifier, for example, "Acadia, Fred A. Smith", would, however, have to be unique.

It is assumed, for creation of a system using CO identifiers, that a mechanism would be created to control issuing the identifiers. This mechanism might be similar to the system now used to issue internet web page addresses and e-mail names.

Another method for creating a convenient CO identifier is the use of the CONTEXT of TIME. For example, it would be desirable for a consumer, in sending a check to a specific "Bob Brown", to simply write Bob Brown in the "pay to" section of a check. But this would not be a sufficiently unique identifier because there are many Bob Browns in the world. But assume that the specific Bob Brown in question was born in January of 1942. Bob Brown might register and then be uniquely identified as "January 1942, Bob Brown". Identifiers of time could include, without limitation: Gregorian years, month names, and Julian dates. Principles used to establish time context could include, without limitation: birth date, graduation date, marriage date, ordination date, retirement date and dates for significant events.

Another method for creating a convenient CO identifier is the use of the CONTEXT of ASSOCIATION. For example, it would be desirable for a consumer, in sending a check to a specific "Jim Small", to simply write Jim Small in the "pay to" section of a check. But this would not be a sufficiently unique identifier because there are many Jim Smalls in the world. But assume that the specific Jim Small in question is an alumni of Northeastern University, that there is only one Jim Small who has attended Northeastern and, for the purposes of CO identifiers, Northeastern has been granted a special prefix "NE". Then a check made out to: "NE, Jim Small" is addressed to a unique individual. Identifiers of association could include, without limitation: schools, firms, clubs, churches, and abbreviations for any of these. Additional identifiers of association could include, without limitation: phone numbers, web addresses and e-mail addresses. For example, "Jim Small@NE.edu" might be a unique identifier used as an identifier on a paper check.

A special class of personal associations, referred to in this document as REVERSE ASSOCIATIONS, can be created by using elements that identify something related to the sending party (payer) as part of the identification of the receiving party (payee). An example of this use could be a father who expects to repeatedly send check to two children. The father is Fred Smith and the children are Jack and Jill Smith. Concatenating a partial sender identifier such as the father's name with a partial receiver identifier such as the receiver's name, may create a unique identifier for the receiver. In this example, the CO identifiers for the recipients could be: "Fred Smith's Jack Smith", and "Fred Smith's Jill Smith" where the use of the name Fred Smith, the sender, creates a reverse association for Jack Smith, the receiver.

For the examples shown in this section, any financial institution that processes checks, upon receiving a check with one of these identifiers, could look up the identifier in an approved index and obtain an identifier suitable for settling the payment using existing settlement methods.

Charitable donations could be a major application of CO identifiers. The contexts of association and apparent identifier can greatly reduce the size and perceived complexity of the CO identifiers involved. To use a CO identifier payment process for this case, for payment using a personal check, the CO identifier is made up as a concatenation of parts. The first part might be a special code symbol that identifies a CO identifier payment. For this example, let this symbol be "CO$". Charitable payments might also be given a special code phrase. For this example, let the code phrase be "Donation to". The use of an exclusive special code phrase establishes an association which allows the creation of a restricted set of identifiers. For this example, the Red Cross might register and then be uniquely identified as "Red Cross"; the March of Dimes might register and then be uniquely identified as "March of Dimes". To make a donation to the Red Cross by personal check, for example, an individual could enter the CO identifier "CO$ Donation to Red Cross" in the "Pay to" field of a personal check. After filling in the donation amount, they could then send the check to their own bank. Upon receiving the check, the bank could access an authorized data file which would provide bank routing information for the donation. The CO identifier would provide sufficient information to process the check. Since CO identifiers can be plural, that is more than one identifier can point to the same account, if the Red Cross also had an exclusive numeric CO identifier for Radio and TV advertising, for this example, the number "22", then a check made out to "CO$ Donation to 22" could also uniquely direct a donation to the Red Cross. Because CO identifiers are inherently secure, lists of identifiers could be published in public media such as the yellow pages. The published list need only include the apparent identifiers, which could appear to be a list of charity names. An example of a portion of such a list is shown as Table 13.

TABLE 13

| Charity identifier for use with checks | Telephone Transaction Number |
| --- | --- |
| March of Dimes | 21 |
| Red Cross | 22 |
| Remember to make your check out as follows: "CO$ Donation to" charity identifier | |

This example assumes the charities are nationwide. Each of these organizations might also have state and local branches. To allow a donation to be made to an individual local branch, a convenient approach might be to use the standard postal abbreviation for each state to be used as a CO identifier prefix using CONCATENATION. The state abbreviation would be a LOCATION context. For example, the Massachusetts branch of the Red cross could be MA22, the Connecticut branch could be CT22 where MA and CT are abbreviations for Massachusetts and Connecticut respectively. A bank receiving an automated request to transfer money would decode the identifiers, which in this case, have been concatenated by the consumer before entry. A typical "pay to" entry might be "CO$ Donation to MA22"

Another convenient approach might be to use the standard telephone area code as a CO identifier prefix using CONCATENATION. The area code would be a LOCATION context. For example, the Massachusetts branch of the Red cross could be 781-22, the Connecticut branch could be 860-22 where 781 and 860 are telephone area codes for Massachusetts and Connecticut respectively. A bank receiving an automated request to transfer money would decode the numbers, which in this case, have been concatenated by the consumer before entry. A typical "pay to" entry might be "CO$ Donation to 781-22"

Payment of utility bills could be a major application of CO identifiers. The contexts of location, association and apparent identifier can greatly reduce the size and perceived complexity of the CO identifiers involved.

To use a CO identifier payment process for this case, for payment using a personal check, the CO identifier is made up as a concatenation of parts. The first part might be a special code symbol that identifies a CO identifier payment. For this example, let this symbol be "CO$". Utility payments, and general bill payments might also be given a special code phrase. For this example, let the code phrase be "Utility payment to". The use of an exclusive special code phrase establishes an association which allows the creation of a restricted set of identifiers. For this example, an electric utility named Standard Engineering might register and then be uniquely identified as "Utility payment to Standard Engineering". While this appears to be an English language phrase or statement, it is not. It is actually a complete CO identifier. To make a monthly utility payment by personal check, for example, an individual could enter "CO$ Utility payment to Standard Engineering" in the "Pay to" field of a personal check. After filling in the payment amount and the other fields on the check, they could then send the check to their own bank. Upon receiving the check, the bank could access an authorized utility data file which would provide bank routing information for the payment. "Standard Engineering" was selected for this example as a fairly common appearing name, which could be expected to also name a number of other businesses in the country or the world such as air conditioning or plumbing firms. The association of the name with the phrase "Utility payment to", however, could make the identification unique to a particular firm, as the number of utilities are much fewer than the number of all businesses. The CO identifier would provide sufficient information to process the check.

Because even the example above may not provide sufficient uniqueness, an additional association might be added. This association could be the reverse association. That is, the name of the sender might be used to help identify the receiver. Consider a utility named General Power, and assume that there are many utilities named General Power in the country. General Power could ask each of its customers to include their name as part of the "pay to" field. A CO identifier for a particular General Power with a customer named Donna Rourke, could be created which would be as follows, "CO$ Utility payment to Donna Rourke's General Power". While this looks like a common phrase, it is actually a complete CO identifier. Any bank receiving a check with this CO identifier in the "pay to" field could access an authorized utility data file with the search key, "Utility payment to Donna Rourke's General Power" and the data file would produce a unique identifier for the specific General Power company that has registered this name. Additional associations could also be used, such as the location of the utility. For example, "Utility payment to Florida's General Power", where Florida does not appear in the official name of a particular utility.

Because CO identifiers are inherently secure, lists of identifiers could be published in public media such as the yellow pages. The published list need only include the apparent identifiers, which could appear to be a list of utility names. While these identifiers may appear long, because they are composed of familiar terms, they would be easy for consumers to use. The benefit to the consumer is the reduction of mailing cost and effort, because multiple utility checks can be collected together and mailed in one envelope to the consumer's own bank for processing. A separate envelope is not required for each check. The benefit to society is the reduction of the separate mailings and check handling required to ultimately return the checks to the consumer's bank.

The use of CO identifiers for employers to make payments to employees was discussed in the section titled: Use of CO Identifiers by Employers to Make Payments. The context of association can be used to simplify processing for employers. For example, accounting systems in companies are often designed to handle data by, identifying individuals using an employee number. Using the ability of CO identifiers to be plural for a given account, a special set of CO identifiers could be created by concatenating the company name with the employee number. For example, the CO identifier "Standard Manufacturing: 203" might specify a CO account for an employee with employee number 203. The company could accomplish the same function as direct deposit by supplying a bank with a list of CO identifiers and salary information. The employer would not have to modify their accounting system to track employee bank account numbers. If employees changed banks, they would make a change in their CO identifier at the bank. The employer would not have to update their system.

One use of CO identifiers with government organizations was discussed in the section titled: Use of CO identifiers by Government Organizations to make payments. The context of association can be used to simplify processing for these organizations. For example, accounting systems are often designed to handle data by identifying individuals using a code number such as the social security number. Using the ability of CO identifiers to be plural for any given account, a special set of CO identifiers could be created by concatenating a special government identification symbol with the individual's identification number. For example, the CO identifier "GovPay 023-45-6789" might specify a CO account for an individual with social security number 023-45-6789. Any government organization could accomplish the same function as direct deposit by supplying a bank with a list of CO identifiers and payment information. The government would not have to modify their accounting system to track individual bank account numbers. If employees changed banks, they would make a change in their CO identifier at the bank. The government would not have to update their system.

Another use of CO identifiers with government organizations was discussed in the section titled: Use of CO Identifiers by Government Organizations to Receive Payments. There are many applications where checks are sent to government organizations. These include: the IRS, state and local tax agencies, the justice departments of cities and towns. All of these check payments can be turned into the equivalent of secure direct deposits using CO identifiers. To help simplify the identification of these organizations, a number of location and association contexts can be employed. For example, a town named Weston in Massachusetts, could establish a bank account with a CO identifier "Weston Mass. 02493". Such an account name would be easy for consumers to remember. Another example for the Internal Revenue Service might establish the CO identifiers "The IRS" or simply "IRS".

Checks sent to an individual's local bank with such a CO identifier in the "pay to" field would create a direct deposit transaction to the IRS. Some examples that depict possible CO identifier constructions could be: Box 23, 01806; Post office 44321; Town Hall, Philadelphia Pa.; USPTO.

Use of Context Sensitive, Concatenated Identifiers and Apparent Identifiers with Wire Transfers If a bank is requested to make a wire transfer to a specified payee, this process becomes simpler with a CO identifier, because less information about the recipient is needed to process the transfer. All a bank would need is a payer ID, if the payer has an account with the bank, the value to be sent and a recipient CO identifier. They would then debit the account of the payer for the value of the transfer plus any fees and initiate an ACH transaction for the transfer value using the recipients CO identifier.

Because CO identifiers can be plural, banks can create their own set of CO identifiers to simplify internal processing or to simplify the process of granting CO identifiers to their clients. For example, using concatenation, a set of CO identifiers could be created by combining the name of the bank with the client name. For example, a bank with the name Jamestown Bank, could be granted a set of CO identifiers of the form "Jamestown Bank: client name", of which one example could be Jamestown Bank: Fred Smith. The process of creating thousands of names would be very simple and could be automated.

Use of Context Sensitive, Concatenated Identifier and Apparent Identifiers with Telephones The use of telephones to make payments puts some severe limitations on CO identifiers. To be practical, only numbers can be used for data entry and the numbers must be short in length. The principle of context sensitive, concatenated identifiers and apparent identifiers can be applied to achieve these goals and make telephone payments practical.

As a general case for telephone use, the context of CATEGORY can be used to drastically reduce the size of identifiers. Some consumer transactions occur more frequently than others while not involving many merchants or organizations. An example is charitable donations. Over 80% of the value of charitable donations are made to less than 100 charities. By identifying categories of transactions like charitable donations and giving them special category identifiers, many transactions can be simplified. Some examples of transaction categories, without limitation, are: location based payments, radio and TV ads, magazines, catalogs, newspapers, charitable donations, utility bills, payments to individuals and tax bills.

In one case, a CO identifier might be used by a merchant with a typical checkout process. The consumer, in this situation, might use a cell phone or wireless communication device to make a payment. In this case, the context of location can greatly reduces the size of a CO identifier. In this case, there might be a very short, unique CO identifier, for example, the number 20, which in fact does not attempt to identify the merchant at all, but simply means use the location coordinates of the communication device to determine the merchant. In this case, the consumer, when asked to enter a transaction identifier, would look near the point of sale for a CO identifier. Seeing the number 20, for this example, they would enter 20 on their phone key pad. The processing center could use the location identification capability of the cell phone system to determine who the merchant is. Going from store to store, the consumer would repeatedly use the same simple process to initiate a purchase. An example process could be: take out their cell phone; press the auto-dial command for their CO identifier processing center; enter transaction code 20. Upon doing this, the processing center could determine the location of the phone. For this example, assume the phone location is 42.20.23N, 71.5.14W where the numbers represent degrees, minutes and seconds of latitude and longitude respectively. A search could be done to find a merchant near this location. For this example, assume the location is exactly correct. Then, the location might be translated directly into a CO identifier where the CO identifier might be the 22 character identifier "LOCATION422023N710514W". This CO identifier would be the identifier of the store that the consumer is in and could be entered into the transaction process just as if the consumer had entered the 22 characters directly on their phone.

Using the CONTEXT OF LOCATION, an UNLIMITED NUMBER of point-of-sale locations could all use the SAME CO identifier and still remain distinct. In this method, the CO identifier would actually be the location coordinates of a point-of-sale station.

While this example discussed use of context of location with the assumption that the merchant location was stationary, the same method, with a modification, can be applied to non-stationary applications. An example of a non-stationary merchant application is a push cart vendor who sets up at different events each weekend. In this case, the merchant could combine the context of location with the CONTEXT OF TIME. By taking advantage of the location sensing ability of the cell phone system, the merchant, in preparation for business, could call a processing center and establish a temporary location identity. This would be done by allowing the processing center to determine the location of the call and instantly creating a CO identifier for the merchant which concatenates the location and time as the identifier. The complete identifier would remain as a persistent record even if the merchant moved to many locations.

There is a complication using the context of location method. Point-of-sale locations must be sufficiently spaced so that they are distinct within the resolution and accuracy capability of the wireless network they are in. A store with multiple, closely spaced cash registers, could not use this method with 2002 technology. In this case, a longer number might be used, such as 2003, where the first two digits, "20" tell the processing center to obtain the location coordinates of the point-of-sale and the second two digits, "03" indicate a cash register identifier. The complete identifier for the specific point-of-sale register could be the concatenation of the location coordinates and the second two digits. Another approach might be to allow the consumer to enter "20" to specify location identification. Then, based on the knowledge that there are multiple cash registers at that location, the processing center might prompt the consumer to enter a cash register identifier.

For ads run on TV or radio, TIME can also be used as a CONTEXT qualifier. For example, say a television program, the Olympics, is offering a special commemorative cup for sale for a limited time. The TV ad might say, for this example, to use CO# 123 to buy the cup where the number 123 is actually a CO identifier. A phone order that concatenates the time with the stated CO identifier number creates a sufficiently complex identifier to discriminate a large number of deposit accounts. In this example, the completely CONCATENATED number could be 2002/02/14:12:18:43-123, where 2002/02/14 is the date (year/month/day), 12:18:43 is the time (hours:minutes:seconds), and 123 is the APPARENT IDENTIFIER. The consumer would only be required to enter the apparent identifier. The processing center could concatenate the time element during processing of the call.

In another example related to TV and radio ads, a CO identifier might be used to identify an item using both the contexts of location and time to greatly reduce the perceived complexity of the CO identifiers. To use a CO identifier payment process for this case, for payment using a telephone, individual item identifiers for advertised merchandise can be broken into parts. One part might be a special identifier that specifies a category of purchase, for example the character "*" might specify a radio or TV ad purchase. A second part might be a station identifier. A third part might be the time the advertisement is run. A fourth might be an item identifier. Most TV and radio stations have very local reception areas. The ads run on broadcast media are usually restricted to short time slots. Consumer's hearing or seeing the ads can be expected to respond in a very short time. An example of the steps involved in a purchase responding to a radio or TV ad could be: take out cell phone; press the auto-dial command for a CO identifier processing center; enter transaction code *23; enter 2 to specify the purchase quantity; enter 1 to confirm the purchase and end the call. To accomplish the purchase, after contacting the processing center, the consumer would have only entered 3 digits to identify the item to be purchased. In this example, the transaction code has two elements. The first element is "*", which is a character available on most phones. It might be reserved exclusively for radio and TV ads. The second element is a station identification digit. In this example, no item identifier needs to be supplied by the consumer because the time at which the ad is run by the station is known and can be matched to a product.

The radio and TV ad example is explained further as an example process using the table shown as Table 12. Column 1 shows actions taken by the consumer. Column 2 shows actions taken by the payment processor in response to the consumer action or which become possible by a preceding result. Column 3 shows data captured by or produced by the action taken in column 2. In the table, time progresses from top to bottom and events proceed by reading left to right.

TABLE 12

| Step | Consumer action | Payment processor action | Data captured by the processor |
|---|---|---|---|
| 1 | Places call | Receives call | |
| 2 | | Checks Caller ID | Identifies communications device |
| 3 | | Looks up consumer ID | |
| 4 | | Looks up payment method | Consumer ID |
| 5 | | Requests transaction code | Authorized payment method and account |
| 6 | Enters *23 | Looks up * code | Determines this is a radio or TV |
| 7 | | Looks up location of phone | ad |
| 8 | | Looks up 23 code | List of stations in the area |
| 9 | | Looks up time | Identifies station running the ad |
| 10 | | Looks up supplier CO identifier | Identifies item from an ad |
| 11 | | Requests quantity | timetable Supplier CO identifier |
| 12 | Enters 2 | Receives quantity | Quantity identified |
| 13 | | Computes total price | Total price including tax |
| 14 | | Requests authorization of total price | |
| 15 | Enters 1 (equals yes) | Receives authorization | Purchase authorized |
| 16 | | Ends call | |
| 17 | Hangs up | Send purchase order to supplier | |
| 18 | | Authorize debit from consumer account | |
| 19 | | Specify payment to supplier account | |

In another case, a CO identifier might be used to identify an item from a magazine or catalog. In this case, apparent identifiers can greatly reduce the perceived complexity of CO identifiers. To use a CO identifier payment process for this case, for payment using a telephone, individual item identifiers in a document are broken into parts. One part might be an identifier that specifies a category of purchase, for example the number "21" to specify catalog purchases and "22" to specify magazine purchases. A second identifier is used to specify the specific magazine or catalog. A third might be a page number. A fourth might be the actual item number. An example of the steps involved in a purchase could be: take out cell phone; press the auto-dial command for a CO identifier processing center; enter transaction code 21 (or 22), which would be listed as a reminder in the document; enter the document number, for example 1234, which would be prominently listed in the document; enter page number, for example 23; enter item number, for example 22. To accomplish this task, after contacting the processing center, the consumer would have entered 10 identification digits for the first item purchased, and typically 4 additional digits for each additional item, page and item number. But because the consumer can understand the code elements, they are entered in short groups, and the entries could be paced by verbal prompts from the processing center, it appears to the consumer that the identity code is only 2 digits long, that is, just the item number.

In another case, a CO identifier might be used to identify an item from a poster, billboard or outdoor display ad. In this case, the contexts of location and time can greatly reduce the perceived complexity of CO identifiers. To use a CO identifier payment process for this case, for payment using a telephone, individual item identifiers for advertised merchandise are broken into parts. One part might be an identifier that specifies a category of purchase, for example the number "24" which might specify a location based ad purchase. A second part might be an item identifier. An important observations for this case is that most poster, billboard and outdoor display ads have very local distribution areas. Another important observation is that the ads in this case must be visually accessed by consumers, therefore assuring that the consumer is physically close to the ad. Another important observation is that the ads run for relatively short time periods. An example of the steps involved in a purchase responding to a poster ad could be: take out cell phone; press the auto-dial command for a CO identifier processing center; enter transaction code 24; enter 3456 to specify the item; enter 2 to specify the purchase quantity; enter 1 to confirm the purchase and end the call. To accomplish the purchase, after contacting the processing center, the consumer would have only entered 6 digits to identify the item to be purchased. In this example, the transaction code has two elements. The first element is "24". It might be reserved exclusively for location based ads. The second element is an item identification digit, in this example, "3456". Using the knowledge that a consumer is near an ad with this number, an identifier made up by concatenating location coordinates with the item identifier would allow the same item identifier to be used repeatedly in different locations.

Using the CONTEXT OF LOCATION, a LARGE NUMBER of products can be advertised using the SAME CO identifier and still remain distinct. In this method, the CO identifier would include the location coordinates of an advertisement through concatenation.

CO identifiers might be used to identify an item from a newspaper. In this case, the context of location and apparent identifiers can greatly reduce the perceived complexity of CO identifiers. To use a CO identifier payment process for this case, for payment using a telephone, individual item identifiers in a newspaper are broken into parts. One part might be an identifier that specifies a category of purchase, for example the number "23" which specifies newspaper purchases. A second identifier is used to specify the specific newspaper. A third might be publication date. A fourth might be page number. A fifth might be a number to identify a specific item. An example of the steps involved in a purchase could be: take out cell phone; press the auto-dial command for a CO identifier processing center; enter transaction code 23, which would be listed for reference in the newspaper; enter the publisher's number, for example 8; enter page number, for example 23; enter item number, for example 12. To accomplish this task, after contacting the processing center, the consumer would have entered 7 identification digits for the first item to purchase, and typically 4 additional digits for each additional item, page and item number. Because the consumer understands the code elements, they are entered in short groups, and the entries could be paced by verbal prompts from the processing center, it appears to the consumer that the identity code is only 2 digits long. For this example, the fact that many newspapers are only distributed in a small geographical area allows the publisher number to be reduced using location sensing. To eliminate problems caused by having newspapers transported into other geographies, the verbal prompting from the processing center could always confirm the newspaper name to the consumer, who would have a chance to correct an error.

An example was previously given for the use of CO identifiers for national charities. The example used: Red Cross=22, March of Dimes=23, as sample values. Each of these organizations has state and local branches. To allow a donation to be made to an individual local branch, a convenient approach might be to use the standard telephone area code as a CO identifier prefix using CONCATENATION. The area code would be a LOCATION context. For example, the Massachusetts branch of the Red cross could be 78122, the Connecticut branch could be 86022 where the first 3 digits, 781 and 860, are telephone area codes for Massachusetts and Connecticut respectively. The letter keys on the phone might also be used to create an alphanumeric "pseudo identifier" such as MA22 for Massachusetts, where MA is the Massachusetts postal code. Unfortunately, the entire set of U.S. postal codes do not relate uniquely to numbers. For example, Alabama (AL) and Alaska (AK) both produce the number 25. So use of this technique with phones is complex.

CO identifiers might be used to identify utilities for telephone payment of bills. To simplify payee identifiers, the context of location, concatenation and apparent identification could be applied simultaneously. Knowing that most utilities have a localized operating region, the LOCATION of subscribers could be used to create a "local utility index" that relates utilities to subscribers. For example, an index could be created for every combination of telephone area code and exchange identifier. The exchange identifier, in the U.S. is the first 3 numbers of the last 7 numbers in a phone number and represents wired telephones directly wired to a single location. For example, in the phone number (860) 828-1234, 828 is the exchange identifier. An index for (860) 828 would show a relatively small number of utilities which service that phone subscriber location. Each utility could then be given a short numeric identifier. For example, electric company A might be 1, electric company B might be 2, gas company A might be 3 etc. There is no significance to these numbers in this example other than that they are distinct and have a unique link to the accounts of the utility companies. A list showing these identification numbers could be published in phone books for the region. In addition to location based identifiers, all payments to utilities might be associated with a special prefix, which for this example could be the number 30. To make a payment to electric company B, a consumer could perform the following steps: call a processing center, enter 30, enter 2, enter the amount to pay, enter 1 to confirm the transaction. To complete this transaction, the processing center would determine the caller from caller ID, would determine that the transaction is a utility payment from the transactions number 30, and then determine the specific utility from the utility identifier 2. Using concatenation, the actual CO identifier for electric company B would be "Utility860-828-02" where 860 is the area code and 828 the phone exchange. To the consumer, the only number they needed to look up was 2, the identifier for the utility, which to them was the APPARENT IDENTIFIER.

CO identifiers might be used to identify individuals for telephone money payments. To simplify payee identifiers, the context of association, and apparent identification could be applied simultaneously. The first simplification could be established by using the context of association to establish a processing category exclusively for phone payments. An example identifier for this category, might be the number 40. To reduce the size of the set of individuals that need to be identified for payments, a consumer could create a personal payment list. This list might be held by a processing center. Establishing the list would best be done using some form of communication other than the phone because, in general, personal CO identifiers are long and best presented in alphanumeric form. This is for convenience, not for security reasons. The Internet might be a good way to do this. Each entry on the payment list could be identified by a number similar to the way telephones now implement memory dialing. To make a payment to person number 12 on the list, a consumer could perform the following steps: call a processing center, enter 40, enter 12, enter the amount to pay, enter 1 to confirm the transaction. The processing center could respond to these steps as follows. Upon receiving the call, the processing center could use caller ID to identify the caller. Upon receiving code 40, which might specify a personal payment transaction, the processing center could look up the personal payment list for the caller. Upon receiving identifier 12, the twelfth CO identifier on the list would be chose for payment. The payment amount would then be accepted, confirmed and processed. In this process, only the number 12 would appear to be an identifier. The other numbers appear to be process elements.

Because CO identifiers are inherently secure, they can be made publicly accessible without concern for fraud. This produces an easy system for creating personal payment lists. A consumer can look up the individual CO identifiers of others in public indexes and copy desired identifiers into their own payment list, either for temporary or long term use.

CO identifiers might be used to conveniently identify an indefinitely large set of individuals for telephone money payments. To simplify payee identifiers, the context of association, reverse association and time could be applied simultaneously. The first simplification could be established by using the context of association to establish a processing category exclusively for reverse association phone payments. An example identifier for this category, might be the number 41. To reduce the size of the set of individuals that need to be identified for payments, a consumer could enlist an action on the part of the recipient. This action would be that the recipient calls a processing center and places their personal CO identifier on a temporary payment list. This might easily be done by calling the processing center and entering a special transaction, such as code 41. The processing center would respond by issuing to the caller a temporary payment number, such as 544. The number might be valid for one hour, for example. The payee would transmit this number to the payer with a phone call. The payer could then call a processing center within the allotted time and enter a transaction code indicating they wished to make a payment, such as code 40. When asked for a payment number, they would supply the temporary payment number, 544 in this example. The range of numbers which can work with this approach depend on the dynamics of how many people are using the method at any time.

Use of Context Sensitive, Concatenated Identifier and Apparent Identifiers with the Internet Because the Internet is accessed with computers that use alphanumeric characters, all of the identifier simplification concepts which are presented in the section: Use of Context Sensitive, Concatenated Identifiers and Apparent Identifiers with Paper Financial Instruments, also apply to the Internet. Because the Internet offers real time processes, a number of additional identifier simplifications could be achieved using the contexts of time, association and apparent identifier.

In a typical web purchase event, a consumer shops the web site and places purchases in a virtual shopping cart. At the end of the purchase, the consumer goes through a check out process in which the web site summarizes the items selected and calculates total price including tax and shipping, which for this example, could be $12.95. The merchant could present a CO identifier on the checkout web page to identify itself generally that the consumer could use to complete the purchase. However, a special CO identifier might be created just for this purchase event using both the contexts of association and time, and using apparent identification to greatly reduce the perceived complexity of the CO identifier. The special identifier for this example could be SS. The consumer could be told that the existing identifier is only valid for 20 minutes, for example.

To use a CO identifier payment process for this case, where payment is being made using a telephone for a purchase being made on the web, the CO identifier could be broken into parts. One part might be a special identifier that specifies a time limited web purchase, for example the characters "*7". A second part might be a shortened form of the merchant identifier, "SS" as an abbreviation for Smart Software for example, which on a telephone would be entered as 77. A third part might be the final price. A fourth part might be the time the web checkout page was generated. To use this method, the web site, after completing and sending the checkout web page to the consumer would also forward a temporary CO identifier to a processing center. For this example, the CO identifier could look like: "*7-77-1295-2002/02/14:12:18:43", where *7 is the short interval web category, 77 is the merchant short identifier, 1295 is the price, 2002/02/14 is the date (year/month/day), 12:18:43 is the time (hours:minutes:seconds). To make this purchase, the consumer would complete the following steps: take out a cell phone; press the auto-dial command for a CO identifier processing center; enter transaction code *7; enter SS to identify the merchant; enter 1295 as the price; enter 1 to confirm the purchase and end the call. In this case, the consumer only sees the SS as the apparent identifier for the merchant, which is very short. The other entries, *7 and 1295 appear to be processing entries. The processing center would generate a complete CO identifier by concatenating the entries and adding a time code. The time codes do not have to be the same as processing can determine a match within a given range. The result, however, would have been to generate a CO identifier with 22 significant digits.

The previous example can be extended further using reverse association. The web site, as part of its check out process can ask the consumer or may have already asked the consumer for their email address or phone number. Both of these could also be generally known to a CO identifier processing center. The web site, in generating a temporary CO identifier could use one or both of these identifiers. For example, the identifier used previously could be expanded to: "*7-77-1295-2002/02/14:12:18:43-Fred Smith@abc.com", where Fred Smith@abc.com is an e-mail address for the consumer. The processing center would understand this coding and also add the consumer's e-mail address to the CO identifier when it generated it. This new addition brings the CO identifier to 40 significant characters. Note that the CO identifier, which is intended to identify an account of the merchant for payment, includes an association to the sender.

To use a CO identifier payment process for the case where both the merchant and payment processor are web sites, there is only small incentive to reduce the size or complexity of CO identifiers because the web user can cut and paste the CO identifiers. However, some aspects of the use of apparent identifiers can be used to make the CO identifiers more readable, especially where a consumer would use many of them at a time and want to track or organize them for later use.

Security Using a Telephone Device Identity for Association With an Account

The objective of using a device identifier instead of transmitting an account number is to eliminate theft of an identifier that can be used fraudulently to take value out of a consumer's bank account. By eliminating financial account numbers from unsecured transmissions, direct theft of account numbers is eliminated. But some method of identification of a consumer's account is still required and must be protected. The CO identifier method uses the identification of the sending device to determine the payment account.

While a financial account number can't be directly stolen during a communication, if a cell phone identifier could be stolen, it might be used to access value. This used to be a problem for cell phones. Sophisticated thieves would monitor cell phone transmissions and record cell phone registration numbers. These would be burned into blank circuit chips and placed in phones other than the owner's authorized phone. The fraudulent phone would then appear to be a copy of the authorized phone. While this was done to fraudulently obtain phone service, it might also fool a processing center into thinking a call had just been received from an authorized phone. This is no longer possible. To eliminate this vulnerability, the phone system has already introduced device number encryption into most phones. What is transmitted by the device is an encrypted device number. That number is decoded by the phone service to authorize the phone call. Caller ID is generated from the decoded identifier.

The phone itself, however, can still be stolen. In this case a legitimate registration number would be transmitted. A CO identifier system could use a number of techniques to mitigate this problem. One is the novel "Delivery to a secure address principle" discussed below. Others are conventional methods that attempt to assure that the phone is being used by an authorized person. One example is the use of conventional user authorization numbers, such as PIN numbers. A second is the use of biometric identification methods such as finger print scanning, retina scanning, face recognition and voice recognition. A third is based on usage patterns. For example, a phone cannot physically be in multiple places at the same time.

Security Using the Device Identity with Wired Telephones for Association with an Account Traditional wired phones, or cordless phones that connect to a telephone wire, can also be used with a CO identifier system. When a call is made from a wired phone to a processing center, that phone can be identified with caller ID. The caller ID is actually associated with the telephone wire and the connection point that the wire makes with the phone switch, not the sending device. This becomes more complicated where multiple phones are connected into private branch exchanges. In most cases, however, the current system is considered reasonably secure. If this changes in the future due to, for example, a wave of fraudulent wiretapping, protective measures similar to those used for cell phones could be used.

Security from an Association Between Device Identity and Delivery to a Secured Delivery Address Security based on an association between device identity and delivery to a secured delivery address only works where goods or services are provided to the delivery address. "Cash and carry" purchases are not protected by this method.

By associating a secured delivery address to a communications device identity, a multiple step process is required for theft. A phone must be stolen; a purchase must be made; the delivery address associated with that phone must be discovered; the timing of delivery must be discovered; the goods or services related to the purchase must be stolen during the shipping process or at the point of delivery. This multiple step process is impractical for a thief. It includes the need to steal goods or services from a location, which a thief can do anyway, without the complication of all the other steps. Furthermore, the other steps in the process are traceable, exposing a thief to capture.

Consumer's frequently want to have goods or services delivered to new locations. To do this, but not allow unauthorized delivery, the process of specifying a new shipping address would have to be done in a secure way. The elements needed to establish the new association are an existing active payment account identifier and a new shipping address. If these items are being provided verbally over a communications system, the security needed becomes an assurance that the person requesting the new address is the true owner of the payment account or that they are authorized to speak for the owner. While caller ID can be used as a secure identifier for CO identifier transactions, it can not be used to verify that a caller is the owner of a specific payment account because the phone might be stolen. An adequate security process which could be used by a secure processing center could include the following steps. Access the personal records of a caller based on a caller ID determined phone number. Run a check on the phone number to determine if it has been reported stolen. Request part of a payment account number from the caller which they say matches the phone they are using. Only a partial number would be requested so that the entire number is not disclosed over the phone system. Use the stated partial payment account number to match the payment number in the data base. If this set of numbers matches, request another identifier, such as the caller's mother's maiden name. If these items match, it is probable that the caller is the owner of the account or has been given secure information about the account. This is so because the probability that a thief has stolen both a phone and payment information is low. But it can be done, for example, if a pocket book was stolen containing both the phone and credit cards. This pocket book theft scenario should guide the selection of the third identifier, which in this example, was the caller's mother's maiden name. This third identifier should not be one that is likely to be found in a purse. Identifiers which would be disqualified are home address, date of birth and social security number, all of which are commonly found in a wallet. With the assurance of a three number match as stated in the example, an address change could be accepted.

Alternatively, a written address change could be accepted. A process using the Internet could also be provided if secure transmission and secure password information were used.

What is claimed is:

1. A method comprising
using a communication device, in connection with an offer of a commercial transaction by an offering party in the transaction, for displaying or otherwise making available a credit-only account identifier that enables a credit transaction to be effected in a financial account of a third party associated with the commercial transaction, the credit-only account identifier being insufficient to enable a debit transaction to be effected in the financial account of the third party, a buyer needing no more than the credit-only account identifier to determine that the credit-only account identifier relates to a credit-only transaction and is of a type that is recognized and accepted for effecting credit-only transactions in financial accounts maintained by the financial institutions for their account holders, and the offering party needing no more than the credit-only account identifier to determine that the credit-only account identifier relates to a credit-only transaction and is of a type that is recognized and accepted for effecting credit-only transactions in financial accounts maintained by the financial institutions for their account holders.

2. The method of claim 1 in which the identifier is made available in advertising associated with the commercial transaction.

3. The method of claim 1 in which the identifier is made available on printed material.

4. The method of claim 1 in which the identifier is made available electronically.

5. The method of claim 1 in which the identifier is made available in proximity to goods or services that are part of the commercial transaction.

6. The method of claim in which the identifier is made available by a party other than the party with which the financial account is associated.

7. The method of claim 1 in which the financial account comprises an account maintained by a banking institution.

8. The method of claim 1 in which the third party comprises an enterprise.

9. The method of claim 1 in which the offering party comprises a seller of goods or services and the credit transaction effects payment for the goods or services.

10. The method of claim 1 in which the offering party comprises a seller of goods or services and the credit transaction effects fulfillment of the goods or services.

11. The method of claim 1 in which the identifier comprises a string of characters.

12. The method of claim 1 in which the identifier is associated with an aspect of the commercial transaction.

13. The method of claim 12 in which the aspect of the commercial transaction comprises an identity of a commodity.

14. The method of claim 13 in which the aspect of the commercial transaction comprises a context of the commercial transaction.

15. The method of claim 14 in which the identifier is unique only with respect to the context in which the commercial transaction occurs.

16. The method of claim 15 in which the context of the commercial transaction comprises a physical location.

17. The method of claim 15 in which the context of the commercial transaction comprises an identity of a vendor of a commodity.

18. The method of claim 1 in which displaying includes advertising a product or service, the advertising including a credit-only account identifier that is associated with making payment for the product or service.

19. A method comprising
accepting, by a business service, using a communication device, from a party, a request to perform a payment transaction, the request including at least two identifiers, the first identifier being sufficient, through a process, to determine a first financial account general identifier, the general identifier being sufficient to enable a debit transaction to be effected in the first financial account, the second identifier being sufficient, through a process, to determine a second financial account credit-only identifier, the credit-only identifier alone being insufficient to enable a debit transaction to be effected in the second financial account, the business service needing no more than the second credit-only account identifier to determine that the credit-only account identifier relates to a credit-only transaction and is of a type that is recognized and accepted for effecting credit-only transactions in financial accounts maintained by financial institutions for their account holders.

20. The method of claim 1 or 19 including forwarding individual or aggregated identifiers to others to use, any of the identifiers alone being sufficient to enable a deposit to be made to a financial account, any of the identifiers alone being insufficient to enable a debit transaction in the financial account.

21. The method of claim 1 or 19 including aggregating commercial or personal transaction data, which is associated with financial identifiers, any of the identifiers alone being sufficient to enable a deposit to be made to a financial account, any of the identifiers alone being insufficient to enable a debit transaction in the financial account.

22. The method of claim 1 or 19 including forwarding individual or aggregated transaction data to others to use, which is associated with financial identifiers, any of the identifiers alone being sufficient to enable a deposit to be made to a financial account, any of the identifiers alone being insufficient to enable a debit transaction in the financial account.

23. The method of claim 1 or 19 including forwarding transaction data to others to use which was obtained by disassociation of aggregated data where the aggregated data contained financial identifiers, any of the identifiers alone being sufficient to enable a deposit to be made to a financial account, any of the identifiers alone being insufficient to enable a debit transaction in the financial account.

24. The method of claim 1 or 19 including processing payment or fulfillment transactions based on data obtained by disassociation of aggregated data, the aggregated data contained financial identifiers, any of the identifiers alone being sufficient to enable a deposit to be made to a financial account, any of the identifiers alone being insufficient to enable a debit transaction in the financial account.

25. The method of claim 1 or 19 including processing payment or fulfillment transactions based on financial identifiers, any of the identifiers being sufficient to enable a deposit to be made to a financial account, any of the identifiers alone being insufficient to enable a debit transaction in the financial account.

26. The method of claim 1 in which the communication device includes an audio or data telecommunication device.

27. The method of claim 1 in which the communication device includes a computer system.

28. The method of claim 1 in which the communication device includes a video display device.

29. The method of claim 1 in which the communication device includes an image printed on paper, plastic or fabric.

30. The method of claim 1 or 19 including aggregating financial identifiers, any of the identifiers being sufficient to enable a deposit to be made to a financial account, any of the identifiers alone being insufficient to enable a debit transaction in the financial account.

31. The method of claim 19 in which the party comprises a purchaser of goods or services and the payment transaction effects payment for goods or services.

32. The method of claim 19 in which the party comprises a payer and the payment transaction effects a transfer of funds.

33. The method of claim 19 in which the request is sent using an electronic communications device.

34. The method of claim 33 in which the communications device includes a cell phone.

35. The method of claim 33 in which the communications device includes a telephone.

36. The method of claim 19 in which the request is sent using an electronic data device.

37. The method of claim 36 in which the data device includes a wireless device.

38. The method of claim 36 in which the data device includes a computer.

39. The method of claim 19 in which the request comprises tones.

40. The method of claim 19 in which the request comprises digital data.

41. The method of claim 19 in which the request comprises voice communications.

42. The method of claim 19 in which the request is sent using a communications network.

43. The method of claim 19 in which the request is sent using a data network.

44. The method of claim 19 in which the request is accepted by a payment processor.

45. The method of claim 19 in which the payment transaction is associated with a commercial transaction.

46. The method of claim 19 in which the payment transaction is associated with a private transaction.

47. The method of claim 19 in which the first identifier comprises a string of characters.

48. The method of claim 19 in which the first identifier is determined from an Internet cookie.

49. The method of claim 19 in which the first identifier is determined from a telephone number.

50. The method of claim 49 in which the telephone number is determined using caller ID.

51. The method of claim 19 in which the first identifier is determined from a device registration number.

52. The method of claim 19 in which the first identifier is persistent through concatenation of a time code.

53. The method of claim 19 in which the process used to translate a first identifier into a financial account general identifier is a table lookup.

54. The method of claim 19 in which the first financial account general identifier is associated with a securely selected shipment address.

55. The method of claim 19 in which the process used to translate a second identifier into a financial account credit identifier is specified by the value of the identifier itself.

56. The method of claim 55 in which the process specified by one or more values of the second identifier includes the use of the spatial coordinates of the purchase location to generate a financial identifier.

57. The method of claim 55 in which the process specified by one or more values of the second identifier includes the use of the time of purchase to generate a financial identifier.

58. The method of claim 55 in which the process specified by one or more values of the second identifier includes the use of a lookup table to generate a financial identifier.

59. The method of claim 19 in which the second financial account credit identifier is associated with an aspect of a commercial transaction.

60. The method of claim 59 in which the aspect of the commercial transaction comprises an identity of a commodity.

61. The method of claim 59 in which the aspect of the commercial transaction comprises a context of the commercial transaction.

62. The method of claim 61 in which the context of the commercial transaction is the physical location at which goods or services are offered for sale.

63. The method of claim 61 in which the context of the commercial transaction is the time at which goods or services are offered for sale.

64. The method of claim 61 in which the context of the commercial transaction comprises an identity of a vendor of goods or services.

65. The method of claim 61 in which the context of the commercial transaction comprises a category of goods or services.

66. The method of claim 19 in which the second financial account credit identifier is associated with an aspect of a private transaction.

67. The method of claim 66 in which the aspect of the private transaction comprises an identity of a payee.

68. The method of claim 67 in which the identity of the payee includes one or more attributes of the payee.

69. The method of claim 67 in which an attribute of the payee is a name.

70. The method of claim 67 in which an attribute of the payee is a date.

71. The method of claim 67 in which an attribute of the payee is a location.

72. The method of claim 67 in which an attribute of the payee is a personal association.

73. The method of claim 66 in which the aspect of the private transaction comprises a context of the private transaction.

74. The method of claim 73 in which the context of the private transaction is the physical location at which a payment is made.

75. The method of claim 73 in which the context of the private transaction is an attribute of the payer.

76. The method of claim 75 in which the attribute of the payer is a date.

77. The method of claim 75 in which the attribute of the payer is a location.

78. The method of claim 75 in which the attribute of the payer is an association or affiliation.

79. The method of claim 19 in which the second identifier comprises a string of characters.

80. The method of claim 79 in which the string of characters is a phone number.

81. The method of claim 79 in which the string of characters is a social security number.

82. The method of claim 79 in which the string of characters is an e-mail address.

83. The method of claim 79 in which the string of characters is a person's name.

84. The method of claim 79 in which the string of characters is a mailing address.

85. The method of claim 79 in which the string of characters is an affiliation group.

86. The method of claim 79 in which the string of characters is a concatenation of identifiers.

87. The method of claim 19 in which financial accounts are maintained by a bank.

88. The method of claim 87 in which the financial account holder is a merchant.

89. The method of claim 87 in which the financial account holder is an individual.

90. The method of claim 87 in which the financial account holder is a charity.

91. The method of claim 87 in which the financial account holder is a business.

92. The method of claim 87 in which the financial account holder is a bank.

93. The method of claim 19 in which the accepting communication device includes an audio or data telecommunication device.

94. The method of claim 19 in which the accepting communication device includes a computer system.

95. The method of claim 19 in which the accepting communication device includes a video display device.

96. The method of claim 19 in which the accepting communication device interprets an image printed on paper, plastic or fabric.

* * * * *

UNITED STATES PATENT AND TRADEMARK OFFICE
CERTIFICATE OF CORRECTION

| | | |
|---|---|---|
| PATENT NO. | : 8,010,451 B1 | Page 1 of 1 |
| APPLICATION NO. | : 12/730008 | |
| DATED | : August 30, 2011 | |
| INVENTOR(S) | : Bruce Nappi | |

It is certified that error appears in the above-identified patent and that said Letters Patent is hereby corrected as shown below:

Column 48, Line 42, In Claim 6, after "claim" insert -- 1 --.

Column 50, Line 20, In Claim 33, delete "communications" and insert -- communication --, therefor.

Column 50, Line 21, In Claim 34, delete "communications" and insert -- communication --, therefor.

Column 50, Line 23, In Claim 35, delete "communications" and insert -- communication --, therefor.

Column 50, Line 38, In Claim 42, delete "communications" and insert -- communication --, therefor.

Signed and Sealed this
Twenty-fifth Day of October, 2011

David J. Kappos
*Director of the United States Patent and Trademark Office*